US012746705B2

(12) United States Patent
Kanjee et al.

(10) Patent No.: US 12,746,705 B2
(45) Date of Patent: Sep. 29, 2026

(54) AUTOMATED WALL FRAME ASSEMBLY SYSTEM

(71) Applicant: MITEK HOLDINGS, INC., Wilmington, DE (US)

(72) Inventors: Manish Kanjee, O'Fallon, MO (US); Cameron Wake, Lilydale (AU); Ganesh Patgar, Truganina (AU); David Schroder, Endeavour Hills (AU); John Whitton, Mill Park (AU)

(73) Assignee: MITEK HOLDINGS, INC., Wilmington, DE (US)

( * ) Notice: Subject to any disclaimer, the term of this patent is extended or adjusted under 35 U.S.C. 154(b) by 0 days.

(21) Appl. No.: 19/252,279

(22) Filed: Jun. 27, 2025

(65) Prior Publication Data

US 2025/0319627 A1 Oct. 16, 2025

Related U.S. Application Data

(62) Division of application No. 18/468,200, filed on Sep. 15, 2023, now Pat. No. 12,365,110.

(Continued)

(51) Int. Cl.
*B27M 3/00* (2006.01)
*B23P 19/04* (2006.01)

(Continued)

(52) U.S. Cl.
CPC ............ *B27M 3/0073* (2013.01); *B25J 9/026* (2013.01); *E04B 2/70* (2013.01); *B23P 19/04* (2013.01)

(58) Field of Classification Search
CPC ...... B27M 3/0073; B27M 1/08; B27M 3/006; B27M 3/0093; B25J 9/026; E04B 2/70; B23P 19/04

(Continued)

(56) References Cited

U.S. PATENT DOCUMENTS 3,592,376 A 7/1971 Moehlenpah
3,628,714 A 12/1971 Offenwanger (Continued)

FOREIGN PATENT DOCUMENTS

DE 19707293 C1 1/1998
EP 2674269 A1 12/2013
GB 2305629 A 4/1997

OTHER PUBLICATIONS

Extended European Search Report, European Application No. 23197596.2, Feb. 15, 2024, 11 pages, The Hague.

(Continued)

*Primary Examiner* — Sarang Afzali
*Assistant Examiner* — Darrell C Ford
(74) *Attorney, Agent, or Firm* — Stinson LLP

(57) ABSTRACT

An automated wall frame assembly system for use in assembling a wall frame includes an advancer assembly including a conveyor system configured to transport first frame members along an assembly axis to an output of the conveyor system. A frame unit is disposed generally at the output of the conveyor system and is configured to receive the first frame members from the conveyor system and attach a second frame member to the first frame members. A gantry assembly is disposed above the advancer assembly. The gantry assembly includes a gantry frame and at least one gantry tool movably attached to the gantry frame. The gantry tool is operable to deliver the second frame member to the advancer assembly from a location above the advancer assembly for being attached to the first frame members.

7 Claims, 29 Drawing Sheets

Related U.S. Application Data

(60) Provisional application No. 63/376,052, filed on Sep. 16, 2022.

(51) Int. Cl.
*B25J 9/02* (2006.01)
*E04B 2/70* (2006.01)

(58) Field of Classification Search
USPC ........................................... 52/745.1, 745.19
See application file for complete search history.

(56) References Cited

U.S. PATENT DOCUMENTS

| | | | | |
|---|---|---|---|---|
| 3,711,007 | A | 1/1973 | Fry | |
| 3,822,815 | A | 7/1974 | Davis | |
| 4,039,112 | A | 8/1977 | Schultz | |
| 4,133,097 | A | 1/1979 | Slade | |
| 4,305,538 | A | 12/1981 | Schultz | |
| 4,620,658 | A | 11/1986 | Martin | |
| 4,708,276 | A | 11/1987 | Knoth et al. | |
| 4,867,819 | A | 9/1989 | Richardelli et al. | |
| 5,555,617 | A * | 9/1996 | Pope | B27M 3/0073 269/910 |
| 5,615,122 | A | 3/1997 | Lacrosse | |
| 6,926,185 | B2 | 8/2005 | Svensson | |
| 7,172,064 | B2 | 2/2007 | Alversson | |
| 8,131,008 | B2 | 3/2012 | Thompson et al. | |
| 8,185,240 | B2 | 5/2012 | Williams et al. | |
| 8,606,399 | B2 | 12/2013 | Williams et al. | |
| 8,925,178 | B2 | 1/2015 | Smith et al. | |
| 8,984,732 | B2 | 3/2015 | Svensson | |
| 9,353,519 | B2 | 5/2016 | Williams | |
| 10,189,176 | B2 | 1/2019 | Williams | |
| 12,168,274 | B2 | 12/2024 | He | |
| 2004/0093731 | A1 * | 5/2004 | Sarh | B64F 5/10 29/897.3 |
| 2005/0102940 | A1 * | 5/2005 | Tyler | B27D 5/003 52/741.1 |
| 2007/0260345 | A1 * | 11/2007 | Mifsud | B21F 27/128 700/165 |
| 2010/0061829 | A1 | 3/2010 | McAdoo et al. | |
| 2014/0116000 | A1 | 5/2014 | Showan | |
| 2019/0136519 | A1 | 5/2019 | Binder | |
| 2020/0376685 | A1 | 12/2020 | Baker et al. | |
| 2020/0378548 | A1 | 12/2020 | Brown et al. | |
| 2020/0379448 | A1 | 12/2020 | Ashworth et al. | |
| 2020/0379451 | A1 | 12/2020 | Ays et al. | |
| 2021/0114251 | A1 | 4/2021 | Kanjee | |
| 2021/0164246 | A1 | 6/2021 | Bellissimo et al. | |
| 2021/0316472 | A1 * | 10/2021 | Svensson | B27M 1/08 |
| 2022/0010608 | A1 * | 1/2022 | Dittrich | E04C 2/386 |
| 2025/0101756 | A1 | 3/2025 | Bellissimo et al. | |

OTHER PUBLICATIONS

Randek, Auto Wall System S3000, 13 pages, Falkenberg, Sweden, Dec. 22, 2015.
Randek, Flexi Range, 11 pages, Falkenberg, Sweden, Dec. 22, 2015.
Weinmann, Frameteq-Customized Production, Life Cycle Services, 40 pages, homag.com/weinmann, Oct. 21, 2019.

* cited by examiner

AUTOMATED WALL FRAME ASSEMBLY SYSTEM

CROSS-REFERENCE TO RELATED APPLICATIONS

This application is a divisional of U.S. application Ser. No. 18/468,200, filed Sep. 15, 2023, which claims priority to U.S. Application No. 63/376,052, filed Sep. 16, 2022, and which are hereby incorporated by reference in their entireties.

FIELD

The present invention generally relates to an automated lumber assembly system, and more particularly to an automated wall frame assembly system.

BACKGROUND

Rising labor costs and demands for more time and cost-efficient construction have made it desirable to construct building components and modules off site at specialized fabrication facilities. With wood frame structures, especially prefabricated residential structures, there are great economies to be realized by providing automated equipment that can assemble lumber components utilized in wall panels, roof trusses, and other prefabricated items. For wood structures where the framing is constructed on site, preassembling lumber off site location can create a kit design minimizing measuring, sawing, and the need for specialized labor on site. This can result in faster construction as well as minimized cost. On-site construction errors can also be minimized.

SUMMARY

In one aspect, an automated wall frame assembly system for use in assembling a wall frame generally comprises an advancer assembly including a conveyor system configured to transport first frame members along an assembly axis to an output of the conveyor system. A frame unit is disposed generally at the output of the conveyor system and configured to receive the first frame members from the conveyor system and attach a second frame member to the first frame members. A gantry assembly is disposed above the advancer assembly. The gantry assembly includes a gantry frame and at least one gantry tool movably attached to the gantry frame. The gantry tool is operable to deliver the second frame member to the advancer assembly from a location above the advancer assembly for being attached to the first frame members.

In another aspect, a method of assembling a wall frame using an automated wall frame assembly system generally comprises transporting first frame members along an assembly axis using an advancer assembly of the automated wall frame assembly system. Delivering a second frame member to the advancer assembly from a location above the advancer assembly using a gantry assembly of the automated wall frame assembly system disposed above the advancer assembly. Attaching the second frame member to the first frame members using the advancer assembly.

In still another aspect, an automated wall frame assembly system for use in assembling a wall frame including a top plate, a bottom plate, studs extending between the top and bottom plates and at least one frame member extending transverse to a lengthwise extent of the studs generally comprises a conveyor system configured to receive the top plate and the bottom plate in a spaced apart, aligned position. A stud positioner is configured to automatically move the stud to a position extending between the top plate and the bottom plate. A first fastener tool is configured to automatically connect the stud to the top plate and the bottom plate when the stud is positioned between the top plate and the bottom plate. A frame member positioner is configured to automatically move frame member stock to a position generally between the top plate and bottom plate and extending transversely to a lengthwise extent of the stud. A second fastener tool is configured to automatically connect the frame member to the stud. A saw is positioned within an envelope of the wall frame assembly system to automatically cut the frame member stock to form the frame member.

Other aspects include an automated system for assembling lumber components into a construct formed from distinct pieces of lumber secured together as shown and described herein.

Still other aspects include a method for assembling a construct from lumber components connected together in the construct using the steps shown and described herein.

BRIEF DESCRIPTION OF THE DRAWINGS

Corresponding parts are indicated by corresponding reference characters throughout the several views of the drawings.

DETAILED DESCRIPTION

Figure 1:
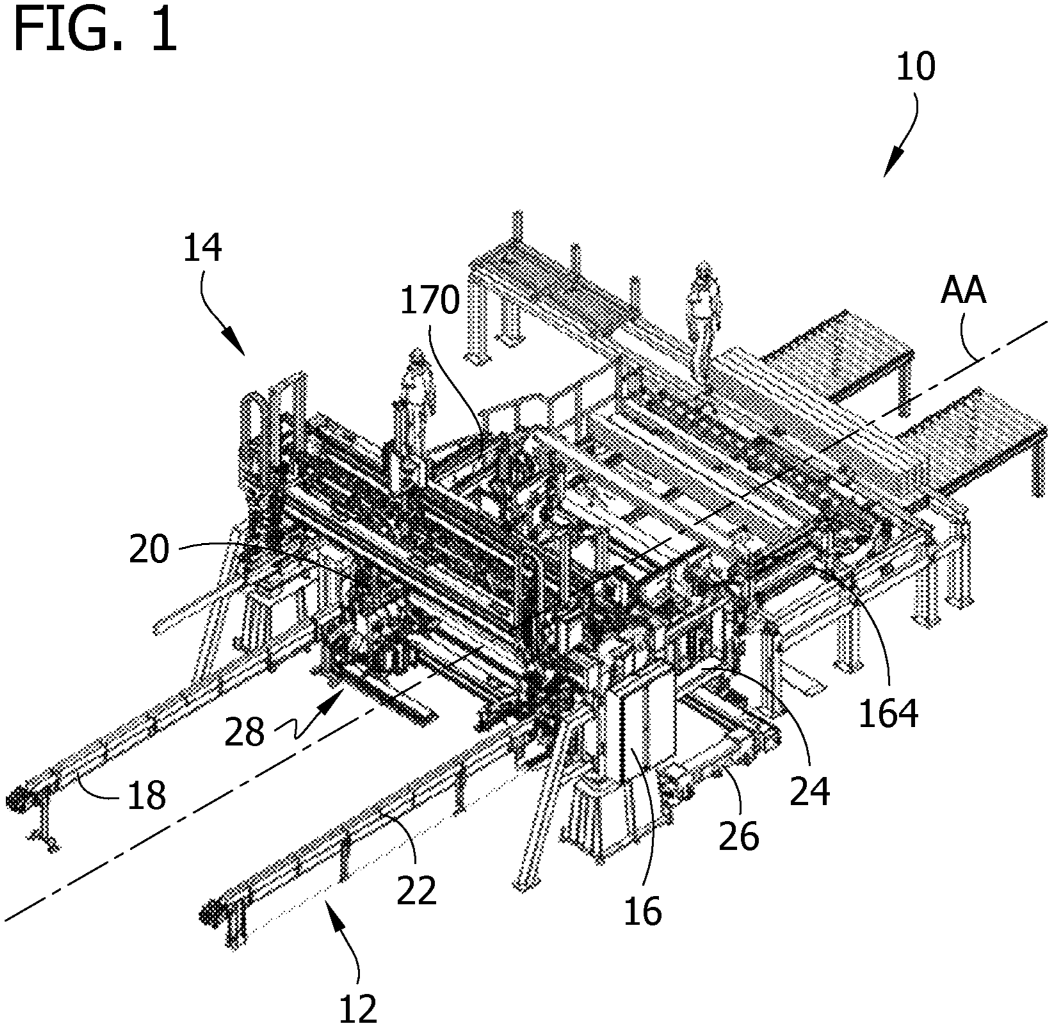
FIG. 1 is a rear perspective of a wall frame assembly system according to the present invention.
Figure 2:
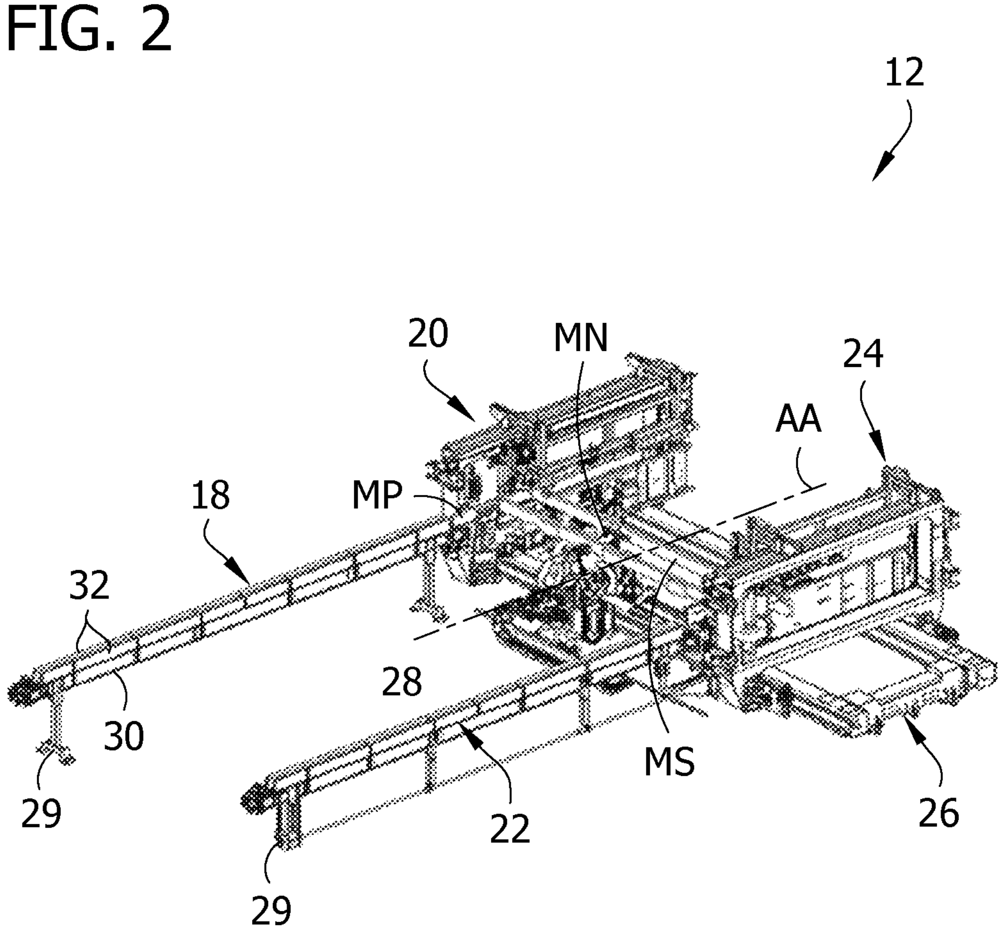
FIG. 2 is a perspective of an advancer assembly of the wall frame assembly system.
Figure 3:
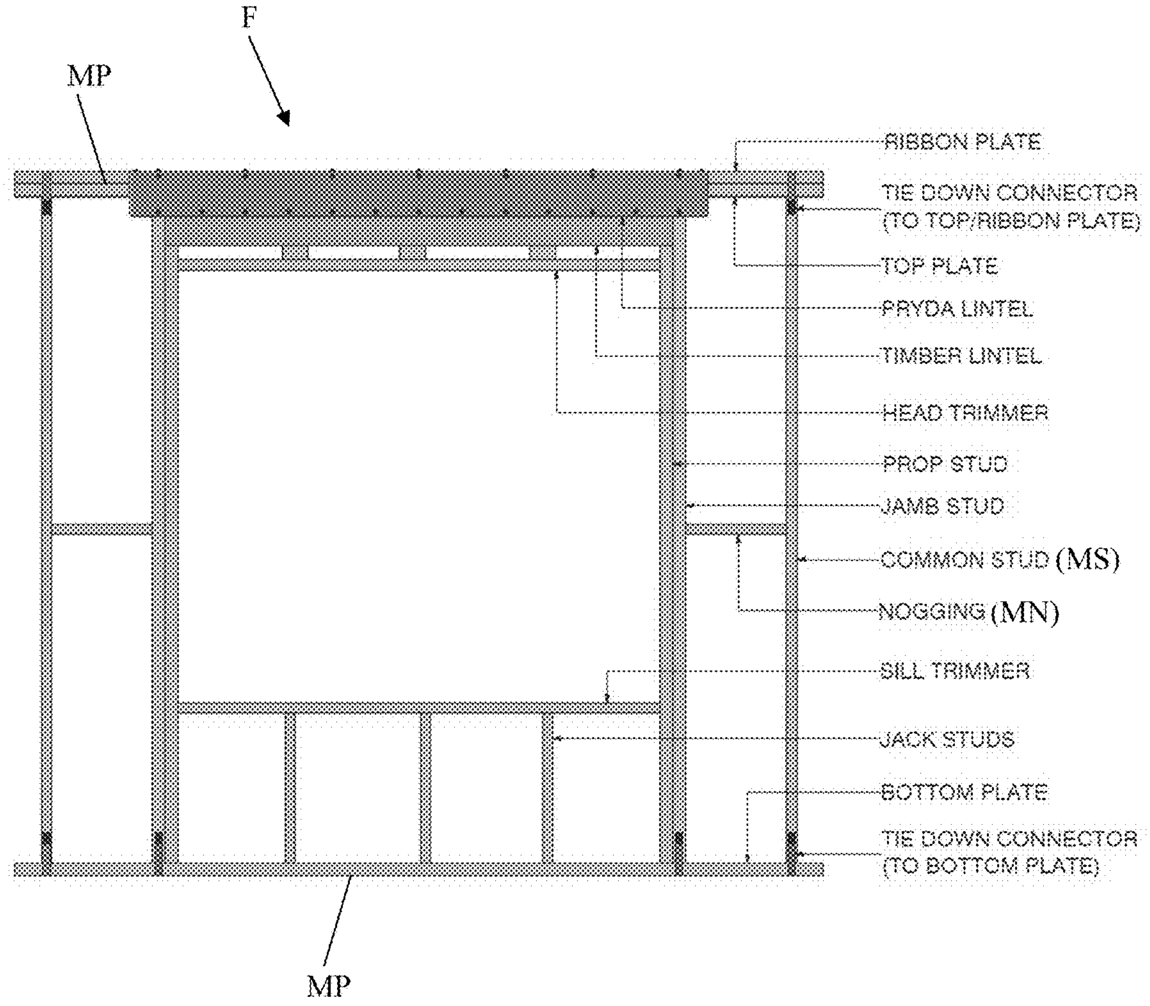
FIG. 3 is an exemplary wall frame that can be assembled by the wall frame assembly system.

Referring to FIGS. 1-3, an automated wall frame assembly system constructed according to the principles of the present invention is generally indicated at 10. The wall frame assembly system 10 includes an advancer assembly 12 configured to attach fame members MP, MS, MN of a wall frame F and deliver the frame members along an assembly axis AA, and a gantry assembly 14 mounted over the advancer assembly for carrying frame members MS, MN to the advancer assembly for assembling those frame members in the wall frame F. Lumber or another material capable of being cut into pieces for use in forming the wall frame F can be used. Broadly, the lumber (or other suitable material) may be manipulated by an automated assembly system to form a construct of distinct pieces of lumber connected together that has utility as a finished product or as a part of a larger construction. Although a fully automated wall frame assembly system 10 is disclosed, a semi-automated system could be used without departing from the scope of the disclosure. Thus, at least some aspects of the wall fame assembly may be performed manually using components of the wall frame assembly system 10 or components separate from the system. Further, although the automated wall frame assembly system 10 is described herein in terms of constructing a wall frame F, the system has application to the production of other items. For example, and without limitation, the system 10 could be used in the manufacture of roof trusses. The wall frame assembly system 10 may also include a control system 16 configured to control operation of the wall frame assembly system (e.g., the operation of each component thereof). In the illustrated embodiment, a single control system 16 is represented. However, it will be understood that multiple control systems operatively connected to each other can be utilized without departing from the scope of the disclosure.

The advancer assembly 12 may comprise a first conveyor 18 extending along the assembly axis AA and including an input end and an output end. A first frame 20 may be disposed generally at the output end of the first conveyor 18. A second conveyor 22 may be spaced laterally (i.e., transverse to the assembly axis AA) from the first conveyor 18 and may also extend along the assembly axis AA and include an input end and an output end. The first and second conveyors 20, 22 can be collectively considered a conveyor system. The conveyor system may be powered or unpowered. A second frame 24 may be generally disposed at the output end of the second conveyor 22. Therefore, in the illustrated embodiment, the second frame 24 is laterally spaced from the first frame 20. In one embodiment, the spacing between the conveyors 18, 22 and the first and second frames 20, 24 is consistent with a height of the wall frame F that can be assembled by the system 10. Thus, it will be understood that the spacing between the conveyors 18, 22 and first and second frames 20, 24 can be adjusted to accommodate the specific design specifications of the wall frame F. Therefore, in one embodiment, the first conveyor 18 and first frame 20 may comprise a fixed conveyor and fixed frame, respectively, such that a lateral position of the conveyor/frame is configured to remain fixed, and the second conveyor 22 and second frame 24 may comprise a movable conveyor and moveable frame, respectively. As such, the second conveyor 22 and second frame 24 may be configured to move laterally (i.e., orthogonally to the assembly axis AA) to adjust the spacing between the first and second conveyors and the first and second frames. However, both the first and second conveyors 18, 22 and the first and second frames 20, 24 may be movable to adjust the distance between the conveyors and frames without departing from the scope of the disclosure. Alternatively, both the first and second conveyors 18, 22 and the first and second frames 20, 24 may be fixed whereby the spacing between the conveyor and frames is not configured to be adjusted. In one embodiment the first and second conveyors 18, 22 may be broadly considered a conveyor system.

A third frame 26 may be disposed below the first and second frames 20, 24 and extend transverse to the assembly axis AA between the first and second frames. An assembly unit 28 may be mounted on the third frame 26 and configured for cutting and attaching frame members MP (e.g., top plate, bottom plate, still trimmer, head trimmer) of the wall frame F during an assembly process. As will be explained in greater detail below, the assembly unit 28 may be attached to the third frame 26 such that the assembly unit is supported by the third frame. Alternatively, the assembly unit 28 may be supported separately from the third frame 26 such as by providing its own support structure on the floor in the assembly space. In one embodiment, the frames 20, 24, 26 may be broadly considered a frame unit. Thus, the frame unit may comprise one or more frames formed separately or attached together.

Referring to FIG. 3, an exemplary embodiment of a wall frame F is shown. The frame illustrates one example of a wall frame that can be assembled by the wall frame assembly system 10. Broadly speaking, the system 10 is configured to assemble wall frames including top and bottom plate members MP, studs MS extending between the plate members, and noggings (or "blocks") MN attached to the studs and extending substantially parallel to the plate members. In the illustrated embodiment, the noggings MN extends between two adjacent studs MS. However, the noggings can have other configurations such as the nogging MN shown in FIG. 29.

Figure 4:
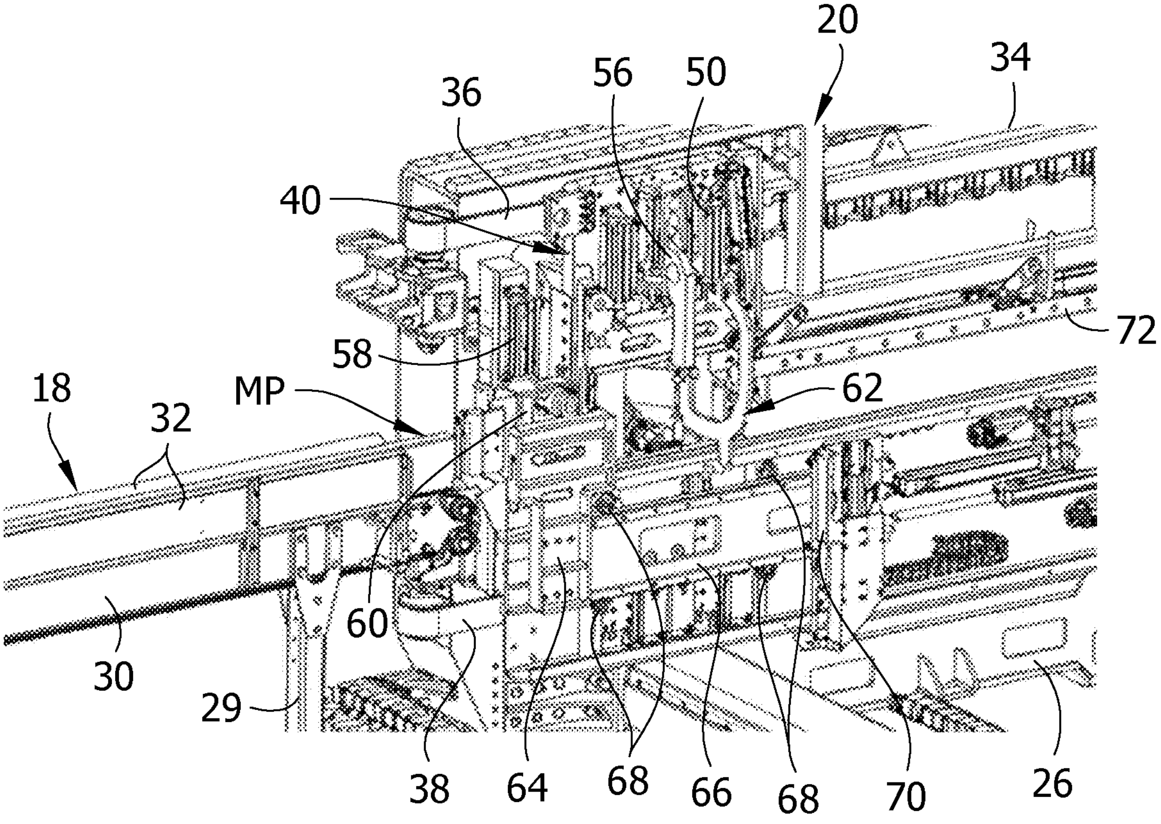
FIG. 4 is an enlarged fragmentary rear perspective view of the advancer assembly of FIG. 2.

Referring to FIGS. 2 and 4, the first and second conveyor 18, 22 may each comprise uprights 29 for supporting the conveyors on the floor in the assembly space, a conveyor platform 30 mounted on the uprights 29 and defining an elongate channel configured to advance a frame member MP along the channel, and a pair of guide walls 32 mounted on top of the conveyor platform to retain the frame member on the conveyor platform. In one embodiment, the channel is sized to receive a frame member MP in a horizontal orientation with major side surfaces of the frame member extending generally vertically and the minor top and bottom surfaces of the frame member extending generally horizontally. As will be explained in greater detail below, the first and second conveyors 18, 22 are configured to receive and deliver top and bottom frame members MP, respectively, to the frames 20, 24, 26 of the advancer assembly 12 for assembling the frame members into the wall frame F. It will be understood that the first and second conveyors 18, 22 could have other configurations without departing from the scope of the disclosure.

Figure 5:
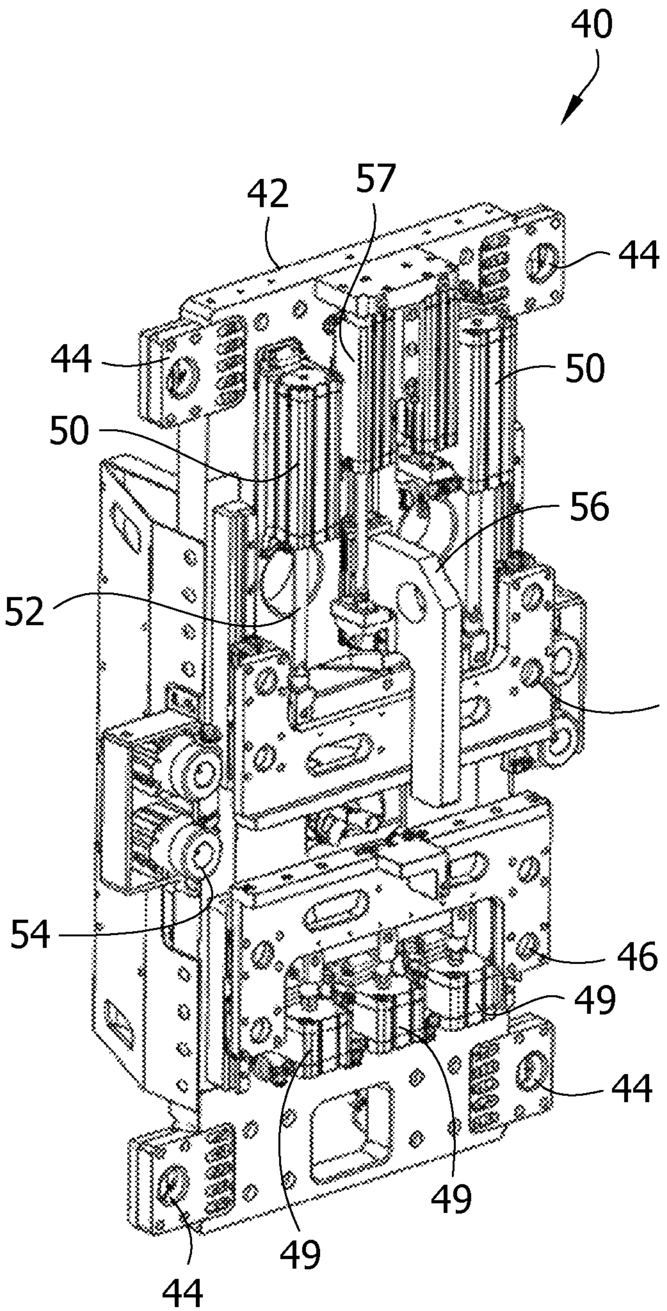
FIG. 5 is a front perspective of a carriage unit of the advancer assembly.
Figure 6:
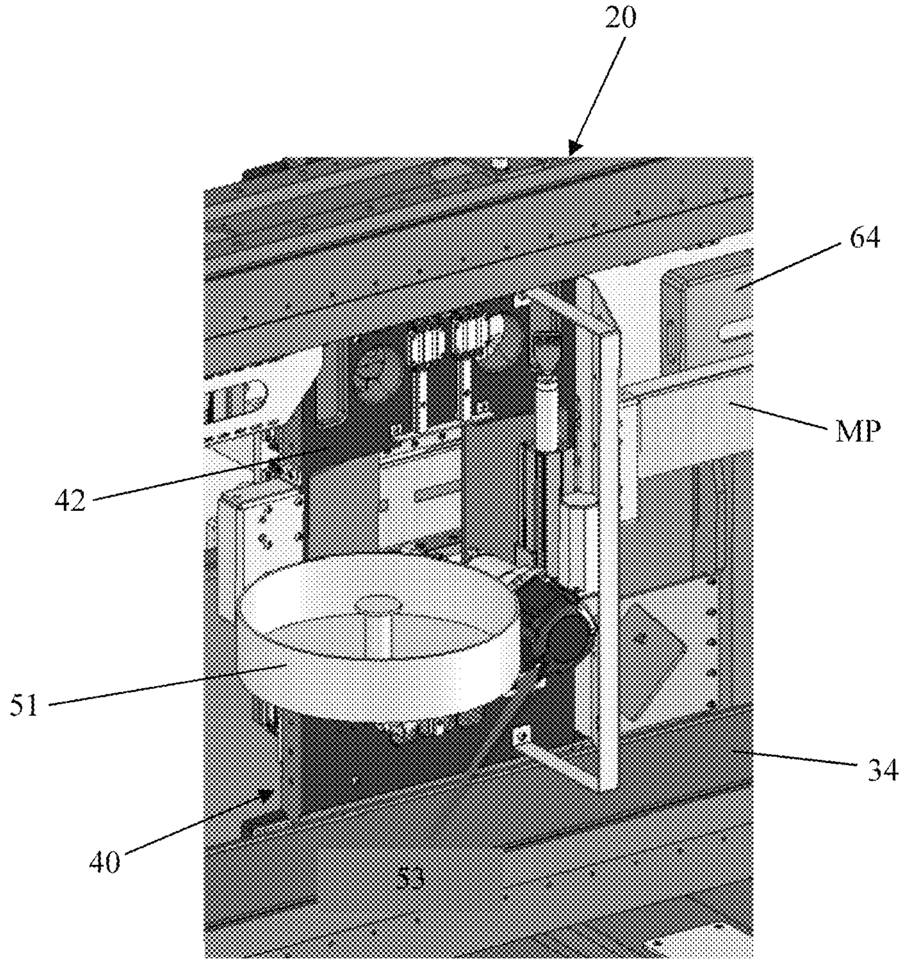
FIG. 6 is an enlarged fragmentary perspective view the advancer assembly of FIG. 2.
Figure 7:
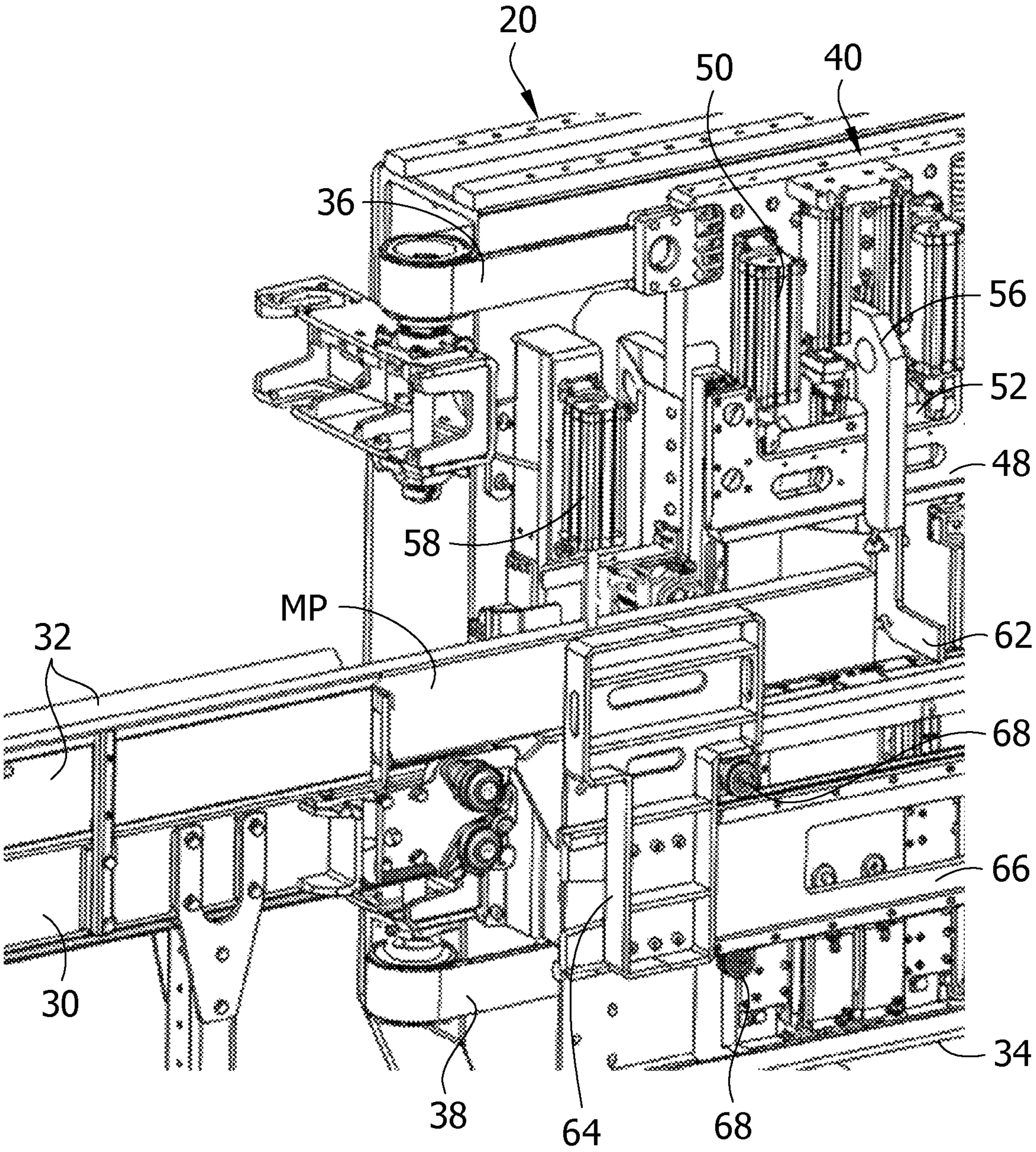
FIG. 7 is an enlarged fragmentary perspective view of the advancer assembly of FIG. 2 showing a reference bar in a first position.

Referring to FIGS. 4-6, each of the first and second frames 20, 24 includes a frame body 34 supported on the floor in the assembly space. For illustrative purposes, only the first frame 20 is shown in detail, however, it will be understood that the second frame 24 includes corresponding components. The frame body 34 comprises a generally rectangular structure extending along the assembly axis AA. However, the frame body 34 could have other configurations without departing from the scope of the disclosure. Upper and lower transport units 36, 38, respectively, are mounted on the frame body 34. In the illustrated embodiment, the upper and lower transport units 36, 38 comprise belts configured to run along the assembly axis AA in both a forward and a rearward direction. The forward direction will be understood to be along the assembly axis AA in the assembly direction and the rearward direction will be understood to be opposite the forward direction. The transport units 36, 38 may be configured to move in unison (i.e., at the same speed), as will be understood in the following description. It will also be understood that the transport units 36, 38 could have other configurations without departing from the scope of the disclosure. Further, although upper and lower transport units 36, 38 are disclosed, a single transport unit or more than two transport units may be provided without departing from the scope of the disclosure.

Each of the first and second frames 20, 24 may have a carriage unit 40 movably mounted thereon. The carriage units 40 are configured to locate the frame members MP, MS relative to each other, temporarily hold the frame members in place, attach the frame members together, and advance the frame members along the assembly axis AA as will be explained in greater detail below. In the illustrated embodiment, the carriage unit 40 comprises a base 42 having coupling components 44 mounted thereon for coupling the carriage unit 40 to the transport units 36, 38 of the frames 20, 24. A bottom fixture 46 and a top fixture 48 are operatively connected to the base 42. The bottom fixture 46 is movable in a vertical direction to adjust the position of the bottom fixture relative to the top fixture 48. Similarly, the top fixture 48 is movable in a vertical direction to adjust a position of the top fixture on the base relative to the bottom fixture 46. In other embodiments, one of the bottom and top fixtures 46, 48 may be fixed and the other fixture may be movable, or both fixtures may be fixed without departing from the scope of the disclosure. Three cylinder actuators 49 mounted on the base 42 are operable to move the bottom fixture 46. A pair of actuators 50 may be mounted on the base 42 of the carriage unit 40 for moving the top fixture 48. The actuators 50 are configured to operate actuator arms 52 attached to the top fixture 48 to move the top fixture in the vertical direction. A nail gun 53 (broadly, a fastener tool) may be mounted on a back of the base 42 and positioned and configured to drive nails (broadly, fasteners) though the frame members MP, MS to attach the frame members together (FIG. 6). A drum 51 next to the nail gun 53 holds a quantity of nails that can be delivered to the nail gun.

Referring to FIG. 5, a plate pusher 54 (broadly, a pusher) may also be mounted on the base 42 of the carriage unit 40. In the illustrated embodiment the plate pusher 54 comprises an elongate rod extending generally vertically along the base 42. As will be explained in greater detail below, the plate pusher 54 is configured to engage the frame member MP (e.g., plate member) transported along one of the conveyors 18, 22 to press the frame member M into another frame member MS (e.g., stud member) for securing the frame members together. A stud clamp 56 (broadly, a clamp) may also be mounted on the base 42 of the carriage unit 40. In the illustrated embodiment, the stud clamp 56 comprises an L-shaped arm having a vertically extending portion configured to engage a fame member MS (e.g., a stud member) to hold the stud member in place prior to being secured to another frame member (e.g., plate member MP), as will be explained in greater detail below. The stud clamp 56 is movable vertically with respect to the base 42 between a raised position (FIG. 4) and a lowered position (FIG. 5). Movement of the stud clamp 56 is driven by a cylinder actuator 57.

Figure 8:
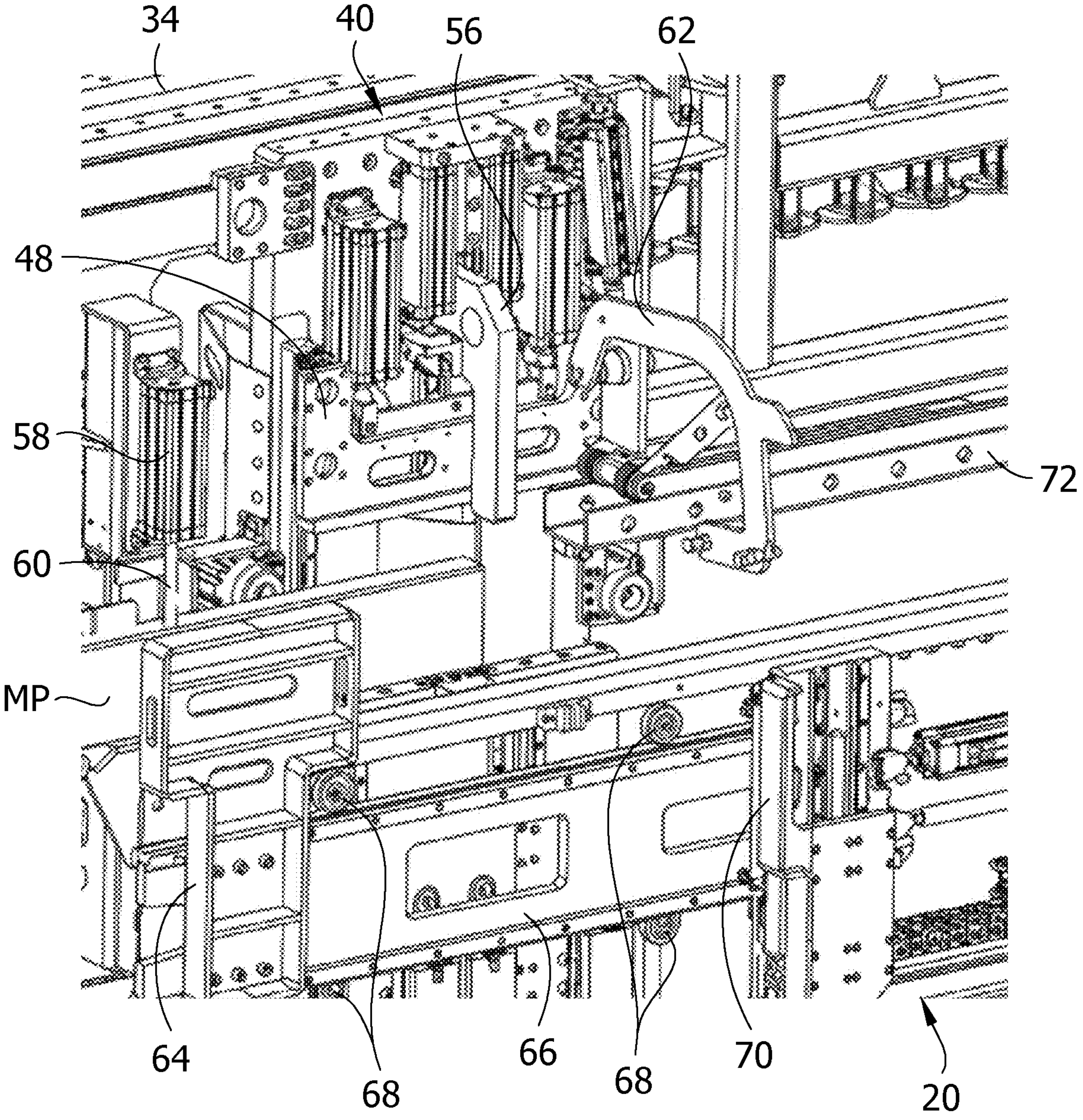
FIG. 8 is an enlarged fragmentary perspective view of the advancer assembly of FIG. 2 showing the reference bar in a second position.

Referring to FIG. 4, each of the first and second frames 20, 24 may have a clamping cylinder 58 (broadly, a clamp) mounted thereon generally adjacent the outlet end of the conveyors 18, 22. The clamping cylinder 58 may include an actuatable clamping arm 60 that is movable in a vertical direction to engage and disengage from the frame members MP, as will be explained in greater detail below. Each of the first and second frames 20, 24 may also have a reference bar 62 attached thereto. In the illustrated embodiment, the reference bar 62 comprises a plate-like structure including a plurality of angled segments. However, the reference bar 62 could have other configurations without departing from the scope of the disclosure. The reference bar 62 may be attached to the frame 20, 24 such that a planar surface of the bar extends generally orthogonal to the assembly axis AA. The reference bar 62 may also be movably (e.g., pivotally) attached to the frame 20, 24 whereby the reference bar 62 is configured to move (e.g., pivot) from a first position as shown in FIG. 4 to a second position as shown in FIG. 8. Thus, as will be explained in greater detail below, the reference bar 62 is movable from the first position in which the reference bar may oppose a path of the frame member MP exiting the output end of the conveyor 18, 22, to the second position in which the reference bar is moved away from the path of the frame member permitting the frame member to be advanced along the assembly axis AA. Accordingly, the reference bar 62 is configured to function as a temporary stop for the frame member MP exiting the output end of the conveyor 18, 22 to locate the frame member for assembly in the wall frame F, as will be explained in greater detail below.

A stud pusher 64 (broadly, a pusher) may also be mounted on each of the first and second frames 20, 24. The stud pusher 64 may be movably mounted on the frames 20, 24 such that the stud pusher is axially translatable along the assembly axis AA. In one embodiment, the stud pusher 64 is mounted on a slide 66 that is slidable along rollers 68 for translating the stud pusher along the frame 20, 24. However, the stud pusher 64 could be movably mounted on the frame 20, 24 by other means without departing from the scope of the disclosure. In the illustrated embodiment, the stud pusher 64 comprises a T-shaped component whereby an upper portion of the stud pusher is configured to engage the frame member MS. However, the stud pusher 64 could have other shapes without departing from the scope of the disclosure. Additionally, a stud back stop 70 (broadly, a stop) may be mounted on each of the first and second frames 20, 24. The back stop 70 may be positioned to be engaged by frame member MS when the frame member is pushed by the stud pusher 64 into the stud back stop 70. Thus, the stud back stop 70 may be configured to locate the frame member MS for being attached to the frame member MP, as will be explained in greater detail below.

Referring to FIGS. 4 and 8, a frame clamp 72 (broadly, a clamp) may be attached to each of the first and second frames 20, 24. The frame clamps 72 are fixedly attached to the frames 20, 24 and mounted at a location above the conveyors 18, 22 such that a sufficient clearance is provided for the frame members MP to be moved beneath the frame clamps when the carriage units 40 advance the frame members along the assembly axis AA. As will be understood with the following disclosure, the frame clamps 72 function to hold the frame members MP down to restrict upward movement of the frame members so that the remainder of the wall frame F can be assembled.

Figure 9:
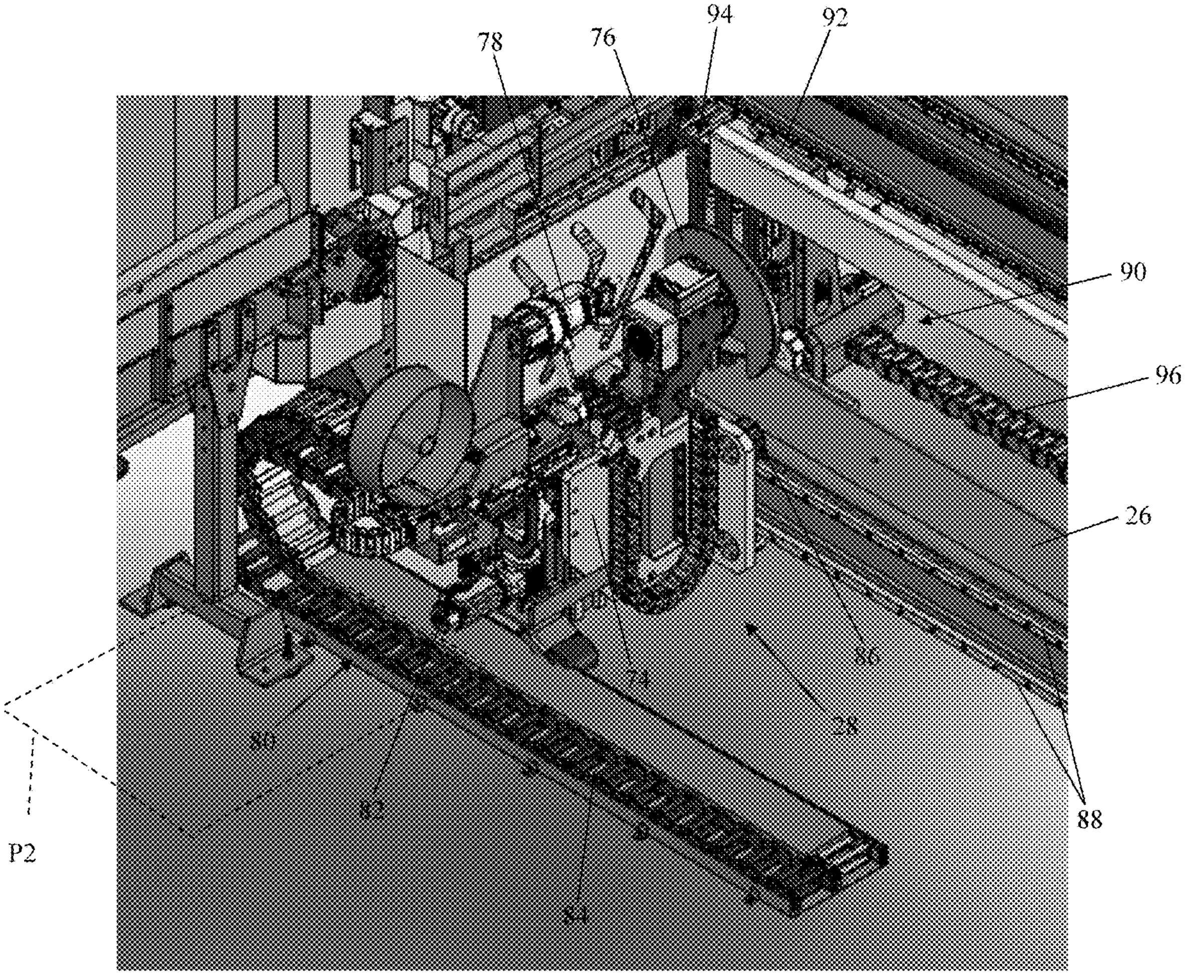
FIG. 9 is an enlarged fragmentary perspective view of the advancer assembly of FIG. 2 showing an assembly unit of the advancer assembly.

Referring to FIG. 9, the assembly unit 28 may comprise a support structure 74 for supporting the assembly unit on the third frame 26, and a saw 76 (broadly, a cutting tool) and nail gun 78 (broadly, a fastener tool) mounted on the support structure. A drive assembly 80 may be operatively attached to the support structure 74 for moving the assembly unit 28 along the third frame 26. In the illustrated embodiment, the drive assembly 80 comprises a motor 82 and a drive 84 operatively connecting the motor to the support structure 74. Activation of the motor 82 may cause the drive 84 to initiate movement of the support structure 74 along the third frame 26. In particular, rollers 86 on the support structure 74 may engage tracks 88 on the third frame 26, and activation of the motor 82 can cause the drive 84 to move the support structure along the tracks 88 on the third frame 26. Thus, the drive 84 may be configured to cause translating movement of the assembly unit 28. In one embodiment, the assembly unit 28 is configured to translate in a horizontal direction generally orthogonal to the assembly axis AA. However, the assembly unit 28 may be mounted and located in the system 10 by other means without departing from the scope of the disclosure.

The saw 76 and nail gun 78 may also be independently and movably mounted on the support structure 74. For example, the saw 76 and nail gun 78 may be configured for vertical movement relative to the support structure 74. The vertical movement of the saw 76 can be used to position the saw for cutting the frame members MN, and the vertical moment of the nail gun 78 can be used to position the nail gun for driving nails into the frame members MS, MN to attach the frame members together. In particular, raising the saw 76 and nail gun 78 from a first, lowered position to a second, raised position can position the saw and nail gun at the proper height for engaging with the frame members MS, MN. As will be explained in greater detail below, the second position of the saw 76 and nail gun 78 locates the tools generally at a first, primary assembly plane P1 (FIG. 25) of the system 10. Therefore, lowering the saw 76 and nail gun 78 to the first, lowered position locates the tools at a second assembly plane P2 (FIG. 9) below the primary assembly plane P1. Accordingly, in the first position, the saw 76 and nail gun 78 are positioned away from the frame members MS, MN so that they will not interfere with the movement of the frame members along the primary assembly plane P1.

Still referring to FIG. 9, a gripper assembly 90 may comprise a support structure 92 for supporting the gripper assembly on the third frame 26, and a nog grabber 94 (broadly, a grabbing tool) mounted on the support structure. In the illustrated embodiment, the gripper assembly 90 is mounted on the third frame 26 generally adjacent to the assembly unit 28. In particular, the gripper assembly 90 and assembly unit 28 may be mounted on opposite sides of a support beam of the third frame 26. A drive assembly 96 may be operatively attached to the support structure 92 of the gripper assembly for moving the gripper assembly along the third frame 26. Similar to the assembly unit 28, the drive assembly 96 of the gripper assembly 90 comprises a motor and a drive operatively connecting the motor to the support structure 92. As such, activation of the motor may cause the drive to initiate movement of the support structure 92 along the third frame 26. Therefore, the drive assembly 96 is operable to cause translating movement of the gripper assembly 90. In one embodiment, the gripper assembly 90 is configured to translate in a horizontal direction generally orthogonal to the assembly axis AA. However, the gripper assembly 90 may be mounted and located in the system 10 my other means without departing from the scope of the disclosure.

Figure 27:
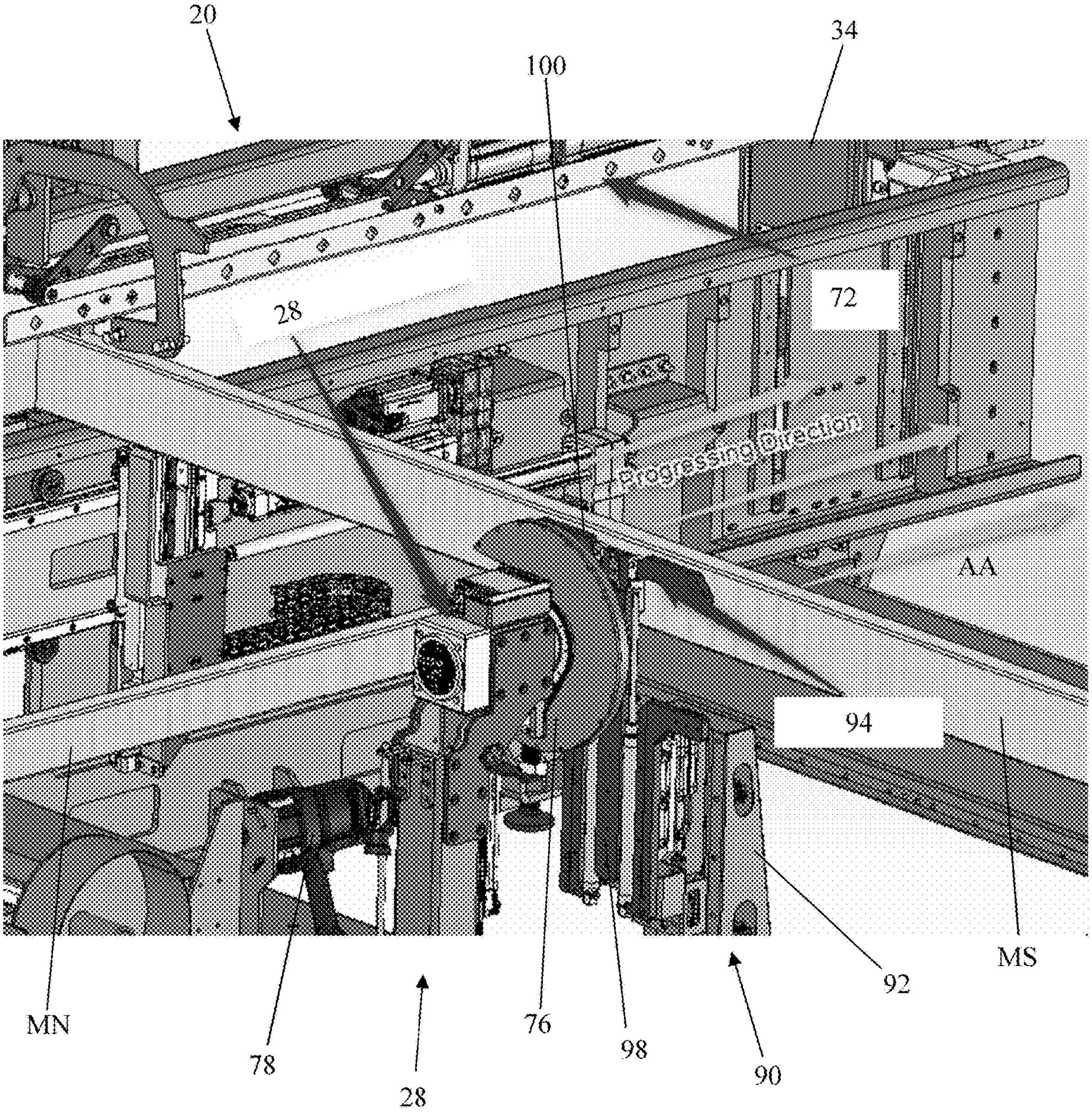
FIG. 27 is an enlarged fragmentary perspective of the advancer assembly showing the assembled frame member unit being cut by the assembly unit.
Figure 28:
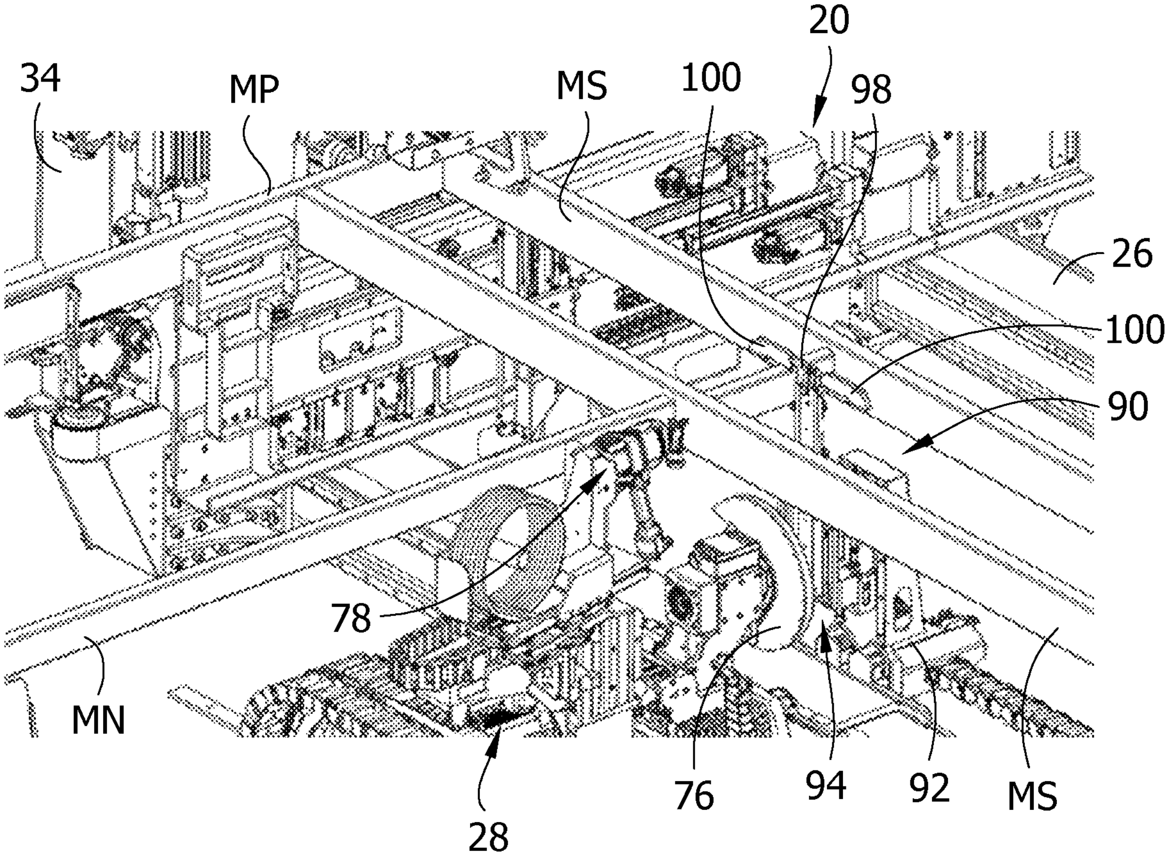
FIG. 28 is an enlarged fragmentary perspective of the advancer assembly showing another assembled frame member unit being attached to the cut assembled frame member unit.
Figure 29:
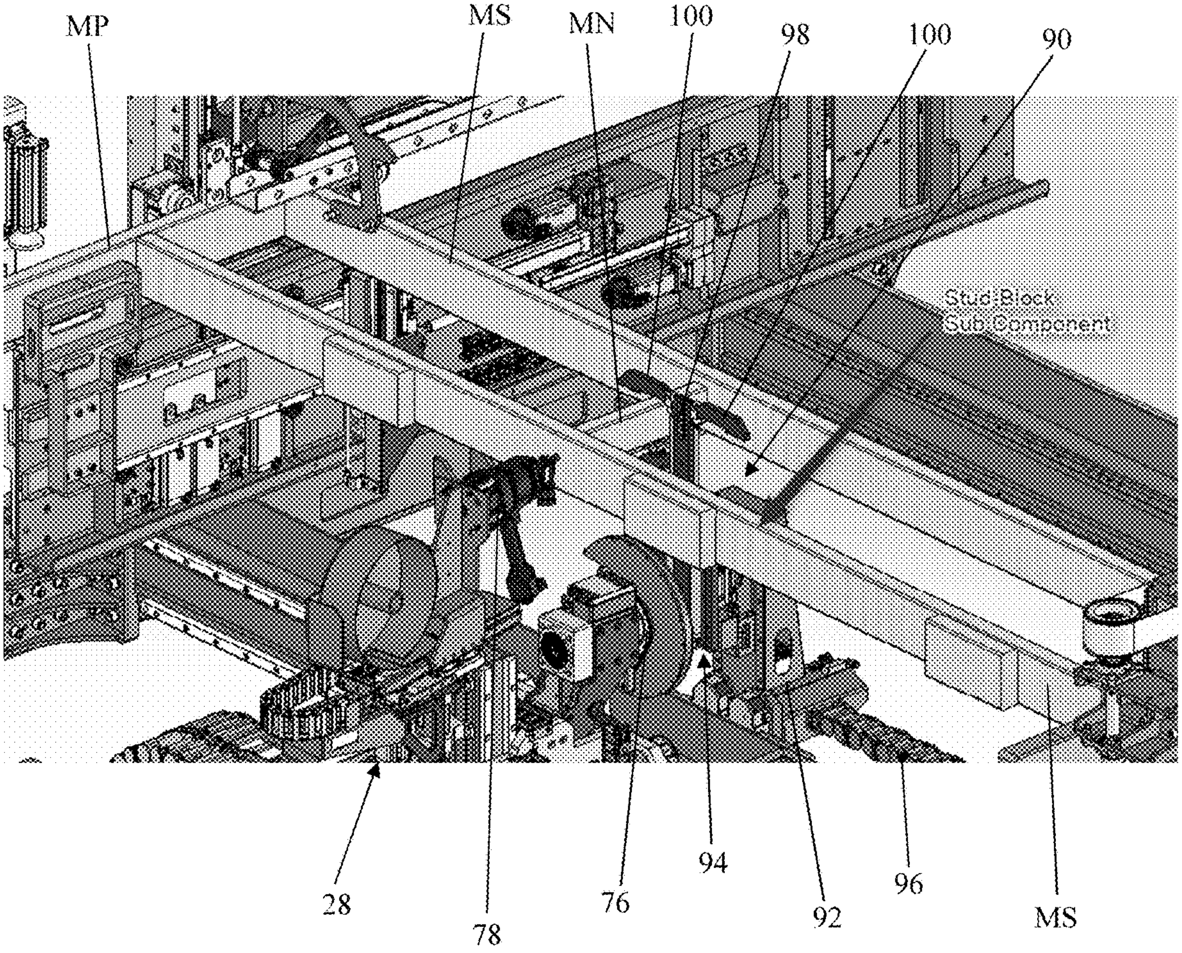
FIG. 29 is an enlarged fragmentary perspective of the advancer assembly showing another frame member unit being attached to the cut assembled frame member unit.

Referring to FIGS. 27-29, the nog grabber 94 may comprise a stem portion 98 and a pair of grabber arms 100 pivotally attached to the stem portion. As will be explained in greater detail below, the arms 100 are actuatable to grab frame members MN for securing the frame members in place prior to being attached to other frame members MS in the wall frame F. The nog grabber 94 may be movably mounted on the support structure 92. For example, the nog grabber 94 may be configured for vertical movement relative to the support structure 92. The vertical movement of the nog grabber 94 can be used to position the nog grabber for grabbing the frame members MN. In particular, raising the nog grabber 94 from a first, lowered position to a second, raised position can position the nog grabber at the proper height for engaging with the frame members MN. As will be explained in greater detail below, the second position of the nog grabber 94 locates the nog grabber generally at the first, primary assembly plane P1 (FIG. 25) of the system 10. Therefore, lowering the nog grabber 94 to the first, lowered position locates the tool at the second assembly plane P2 (FIG. 9) below the primary assembly plane P1. Accordingly, in the first position the nog grabber 94 is positioned away from the frame members MS, MN so that it will not interfere with the movement of the frame members along the primary assembly plane P1.

Figure 10:
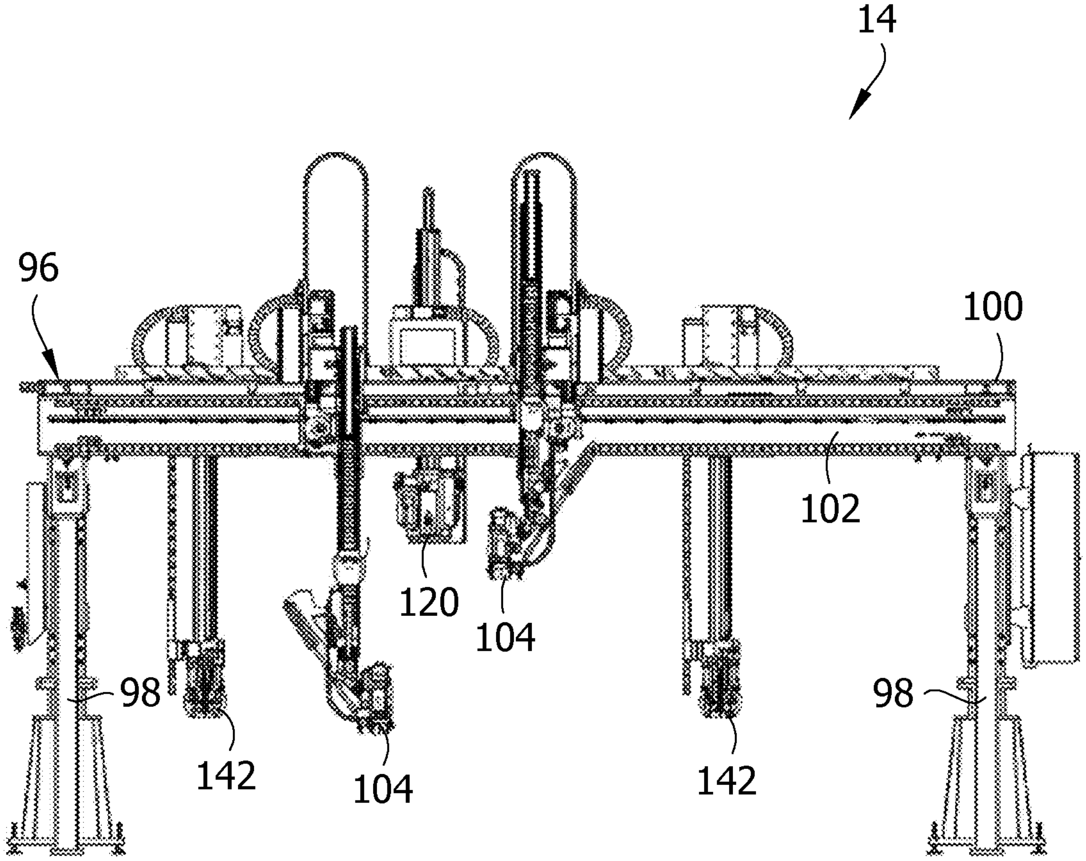
FIG. 10 is a front view of a gantry assembly of the wall frame assembly system.

Referring to FIGS. 1 and 10, the gantry assembly 14 is disposed on opposite lateral sides of the advancer assembly 12 and extends above at least a portion of the advancer assembly such that the gantry assembly is positioned generally around the advancer assembly 12. The gantry assembly 14 comprises a gantry frame 96 including a pair of vertical supports 98 and a gantry 100 extending between the vertical support. The vertical supports 98 are disposed opposite respective outer surfaces of the first and second frames 20, 24 of the advancer assembly 12 and extend upward to a location above the first and second frames. The gantry 100 connects to the vertical supports 98 generally at the tops of the vertical supports providing a support structure extending above the advancer assembly 12. In the illustrated embodiment, the gantry 100 comprises a pair of horizontal support beams 102, 103 (see, FIG. 15) extending between the vertical supports 98. The support beams 102, 103 are spaced apart from each other by a distance extending along the assembly axis AA. The support beams 102, 103 provide structure on the gantry 100 for supporting gantry tools used to assemble the wall frame F. It will be understood, however, that the gantry frame 96 could be otherwise constructed without departing from the scope of the disclosure.

Figure 11:
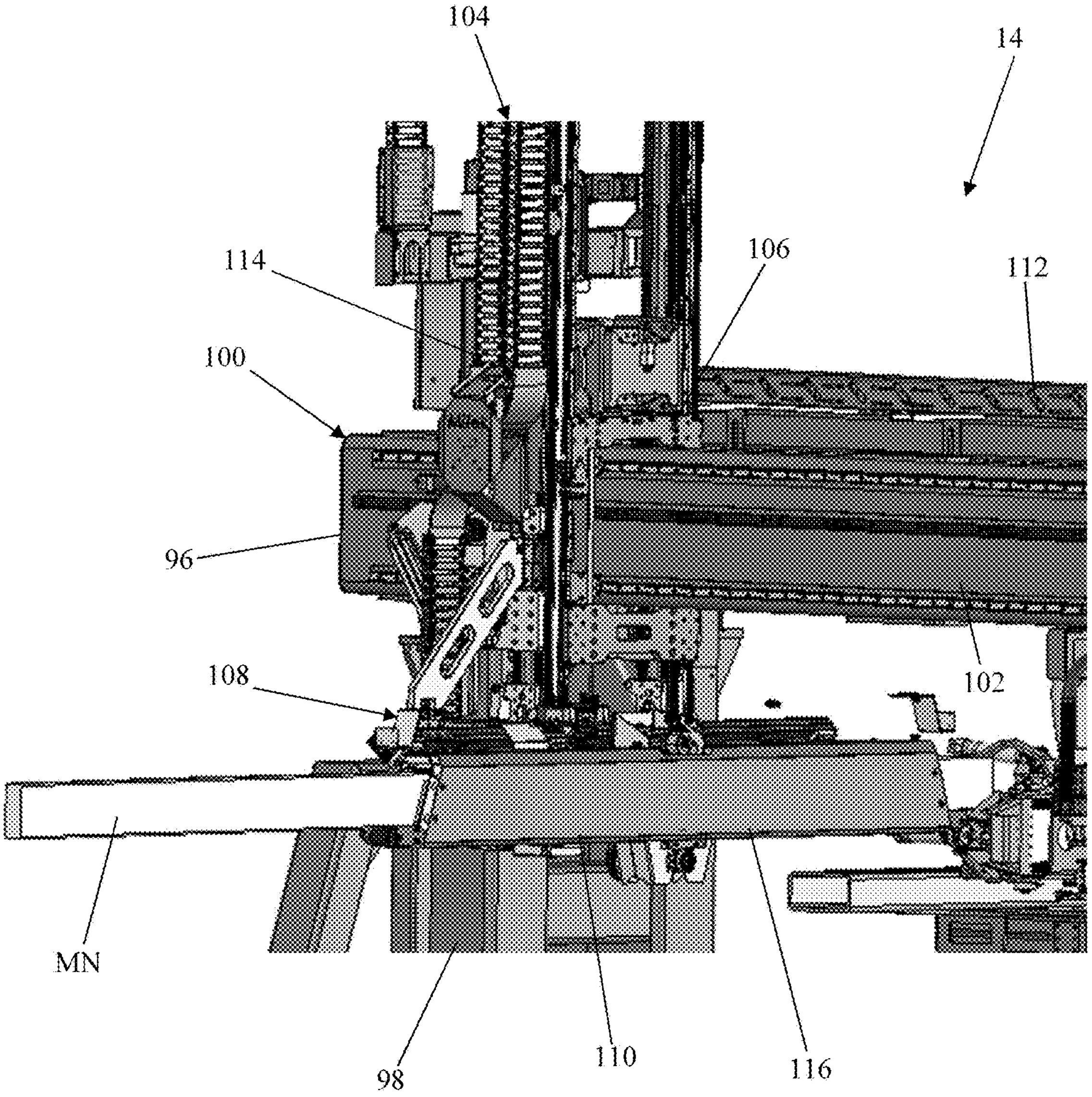
FIG. 11 is an enlarged fragmentary perspective view of the gantry assembly showing a nog fetcher of the gantry assembly.
Figure 12:
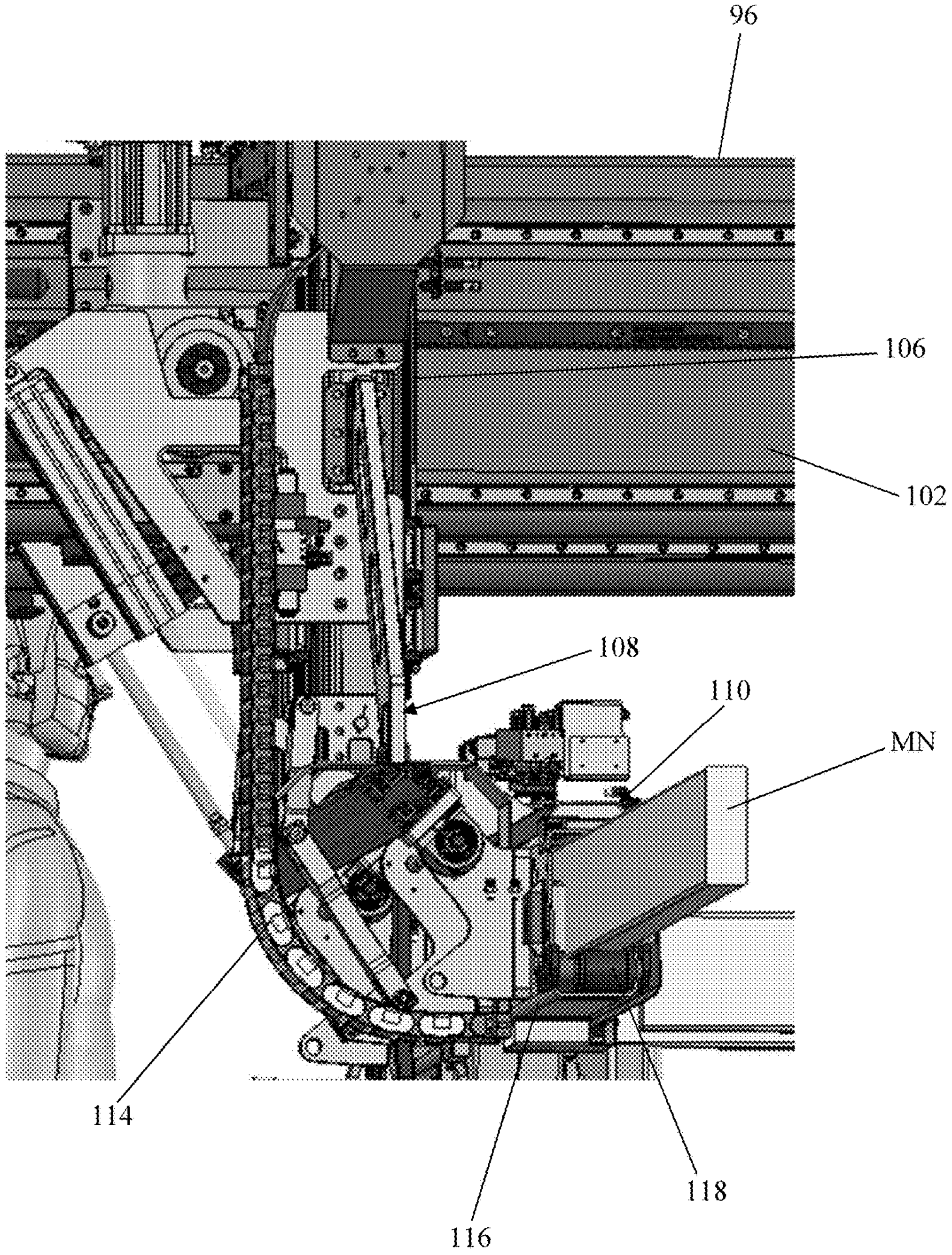
FIG. 12 is another enlarged fragmentary perspective view of the gantry assembly showing the nog fetcher of the gantry assembly.

Referring to FIGS. 10-12, a pair of nog fetchers 104, (broadly, gantry tools) are mounted on a first support beam 102 of the gantry frame 96. In the illustrated embodiment, there are two nog fetchers 104, however, a single nog fetcher or more than two nog fetchers could be utilized without departing from the scope of the disclosure. Each nog fetcher 104 comprises a mount 106 for mounting the nog fetcher 104 on the first support beam 102, and a carriage 108 attached to the mount. The carriage 108 may include a frame holder 110 for holding a frame member MN such as a nogging, as will be explained in greater detail below. The mount 106 may be movably attached to the first support beam 102 such that the nog fetcher 104 is movable along the length of the first support beam to adjust a lateral position of the nog fetcher. In particular, a drive assembly 112 mounted on the gantry frame 96 may be operatively attached to the mounts 106 of the nog fetchers 104 for moving the nog fetchers along the first support beam 92. In the illustrated embodiment, the drive assembly 112 comprises a drive chain, however, other means for moving the nog fetchers can be implemented without departing from the scope of the disclosure. The nog fetchers 104, or at least a portion of the nog fetchers, may also be moveable in a vertical direction to adjust a vertical position of the nog fetchers. In particular, the carriage 108 may be movably attached to the mount 106 whereby a height of the carriage can be adjusted from a first, elevated position to a second, lowered position during the process of assembling the wall frame F. For example, the carriage 108 may be positioned for attaching the frame member MN in the frame holder 110 to another frame member MS when the carriage is in the first position, and the carriage may be positioned for attaching the frame members MN, MS to other frame members MP when the carriage is moved to the second position. The second position may be disposed generally at the first assembly plane P1, and the first position may be considered to be disposed at a third assembly plane P3 (FIG. 19) located above the first primary assembly plane P1. In one embodiment, a drive assembly 114 may be attached to the mount 106 and operatively attached to the carriage 108 for moving the carriage vertically (i.e., up and down) with respect to the mount. In the illustrated embodiment, the drive assembly 114 comprises a drive chain, however, other means for moving the carriage can be implemented without departing from the scope of the disclosure.

Referring to FIGS. 11 and 12, the frame holders 110 of the nog fetchers 104 comprise sleeve members 116 sized to hold a frame member MN within an interior space of the sleeve member. In the illustrated embodiment, each sleeve member 116 has a rectangular cross-section defining a rectangular interior space. However, the frame holders 110 could have other shapes without departing from the scope of the disclosure. The frame holders 110 may also be configured to move the frame member MN within the interior space of the sleeve member 116 to position the frame member for attachment to another frame member MS. In one embodiment, a belt system 118 is disposed in the sleeve member 116 and configured to transport the frame member MN in the sleeve member along the belt system to adjust the position of the frame member in the frame holder 110. The belt system 118 may also be used to assist in inserting a frame member MN into the frame holder 110. In one embodiment, the belt system 118 is configured to move the frame member MN along the assembly axis AA to position the frame member as needed. As will be explained in greater detail below, the belt system 118 may be activated to move the frame member MN into close proximity to or engagement with another frame member MS for subsequent attachment of the frame members. It will be understood that the belt system 118 could be omitted or alternative means for adjusting the position of the frame member MN in the frame holder 110 could be utilized without departing from the scope of the disclosure.

Figure 13:
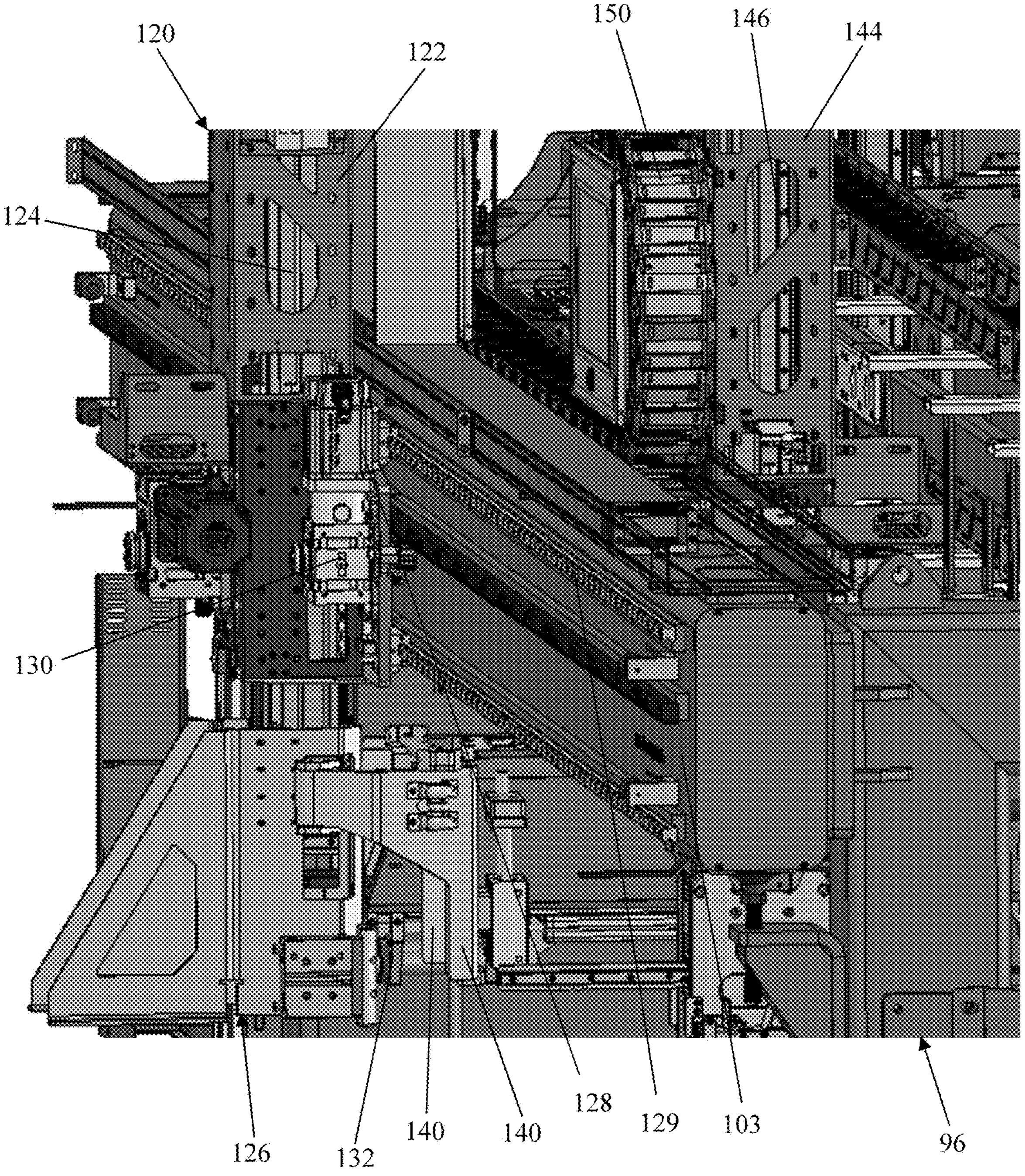
FIG. 13 is an enlarged fragmentary perspective view of the gantry assembly showing a nailer assembly of the gantry assembly.
Figure 14:
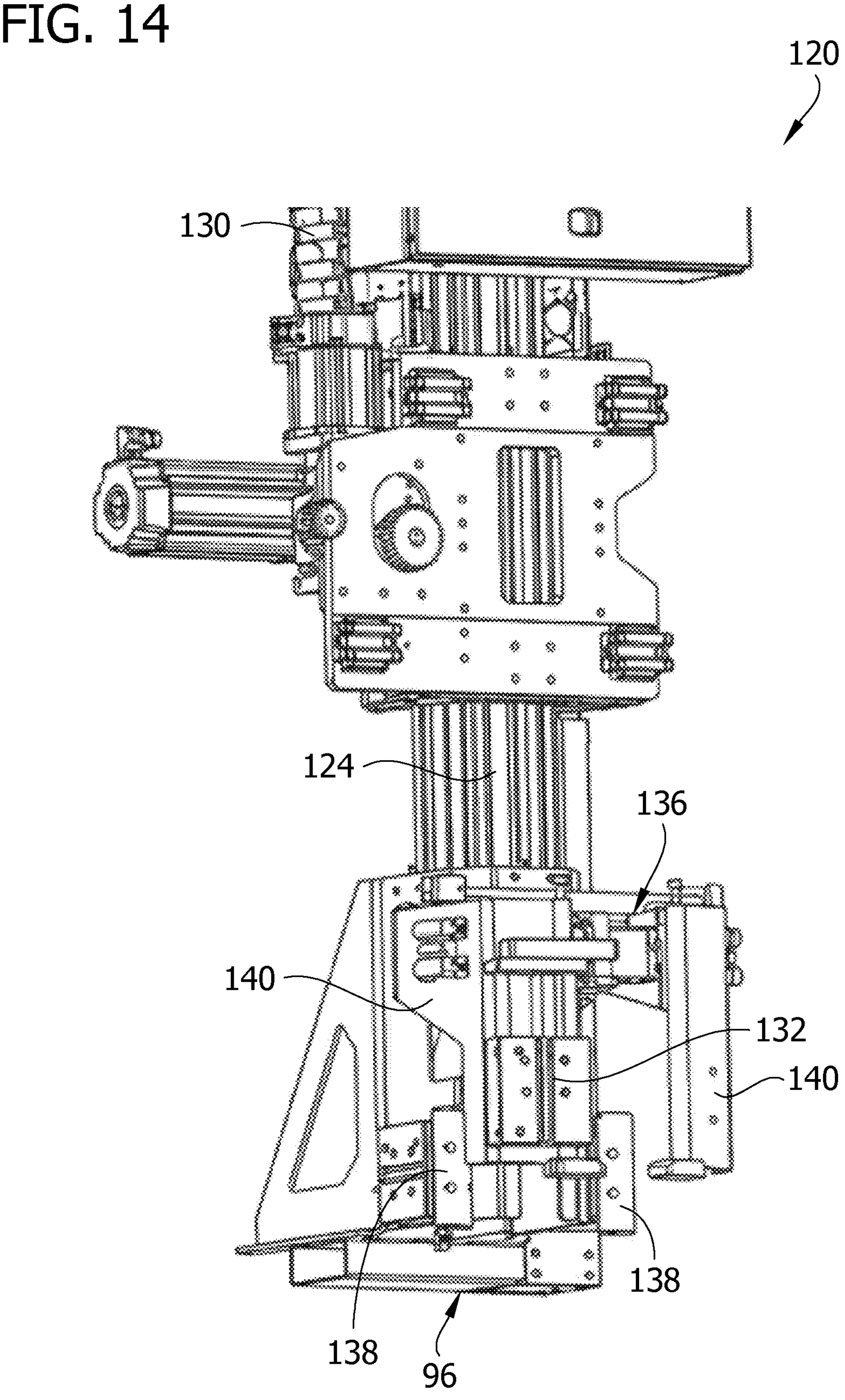
FIG. 14 is an enlarged fragmentary perspective of the nailer assembly.

Referring to FIGS. 10, 13, and 14, a nailer assembly 120 (broadly, a gantry tool or joiner) may be mounted on a second support beam 103 of the gantry frame 96. In the illustrated embodiment, there is a single nailer assembly 120, however, multiple nailer assemblies could be utilized without departing from the scope of the disclosure. The nailer assembly 120 may comprise a mount 122 for mounting the nailer assembly 120 to the second support beam 103, a column 124 attached to the mount, and a nailer 126 (broadly, a fastener tool) attached to the column. The mount 122 may be movably attached to the second support beam 103 such that the nailer assembly 120 is movable along the length of the second support beam to adjust a lateral position of the nailer assembly. In particular, a drive assembly 128 mounted on the gantry frame 96 may be operatively attached to the mount 122 of the nailer assembly 120 for moving the nailer assembly along the second support beam 103. In the illustrated embodiment, the drive assembly 128 includes a drive motor engaged with a track 129 on the second support beam 103, however, other means for moving the nailer assembly can be implemented without departing from the scope of the disclosure. The nailer assembly 120, or at least a portion of the nailer assembly, may also be moveable in a vertical direction to adjust a vertical position of the nailer assembly. In particular, the column 124 may be movably attached to the mount 122 whereby a height of the column can be adjusted to locate the nailer 126 at the proper location for engaging with frame member MS, MN. For example, a drive assembly 130 may be attached to the mount 122 and operatively connected to the column 124 for moving the column vertically (i.e., up and down) with respect to the mount. In the illustrated embodiment, the drive assembly 130 comprises a motor, however, other means for moving the carriage can be implemented without departing from the scope of the disclosure.

Referring to FIGS. 13 and 14, the nailer 126 may comprise a nail gun 132 for driving nails into the frame members MS, MN to attach the frame members together, a drum 134 (FIG. 20) attached to the nail gun for supplying the nails to the nail gun, and a clamp unit 136 for holding the frame members in place prior to attaching the frame members together with the nail gun. The clamp unit 136 may comprise a pair of back stops 138, and a pair of clamp arms 140 movably attached to the nailer 96. As will be explained in greater detail below, the back stops 138 are configured to locate a frame member MS relative to the nailer 96, and the clamp arms 140 are movable to a clamp position (FIG. 20) to engage another frame member MN for attaching the frame members together with the nail gun 132. The clamp arms 140 are further movable to an open position for releasing the frame member MN to allow the frame members to be delivered to the advancer assembly 12.

Referring to FIGS. 10 and 15-17, a pair of descenders 142 (broadly, gantry tools or stud positioners) are mounted on the second support beam 103 of the gantry frame 96. In the illustrated embodiment, there are a pair of descenders 142, however, a single descender or more that two descenders could be utilized without departing from the scope of the disclosure. Each descender 142 comprises a mount 144 for mounting the descender 142 to the second support beam 103, a column 146 attached to the mount and extendable below the mount, and a holder 148 attached to the column for grasping and holding frame members MS. The mount 144 may be movably attached to the second support beam 103 such that the descenders 142 are movable along the length of the second support beam to adjust a lateral position of the descenders. In particular, a drive assembly including a motor (not shown) and a track 150 mounted on the second support beam 103 for moving the descenders along the second support beam. The drive assembly may be configured to move the descenders 142 in unison such that the descenders remain equally spaced from a center of the gantry frame 96. Thus, the descenders 142 may remain laterally spaced from the center of the gantry frame 96 by an equal distance at all times. Alternatively, the drive assembly may move each descender 142 separately. In the illustrated embodiment, the drive assembly comprises a motor, however, other means for moving the descenders 142 can be implemented without departing from the scope of the disclosure. Each descender 142, or at least a portion of the descender, may also be moveable in a vertical direction to adjust a vertical position of the descender. In particular, the column 146 may be movably attached to the mount 144 whereby a height of the column, and thus the holders 148 on the columns, can be adjusted to position the holders at the proper location for receiving the frame members MS and delivering the frame members to the advancer assembly 12. For example, a drive assembly 152 may be attached to each mount 144 and operatively attached to their respective column 146 for moving the column vertically (i.e., up and down) with respect to the mount. As will be explained in greater detail below, the descenders 142 may be movable from an elevated, stored position prior to receiving a frame member MS to a first lowered position for receiving a frame member. The descenders 142 may then be further movable to a second, lowered position for locating the holder 148 adjacent the advancer assembly 12. Thus, the descenders 142 may be broadly described as being movable from a fourth assembly plane P4 (FIG. 17) to the third assembly plane P3 for receiving frame members MS during the assembly process, and further movable from the third assembly plane to the first assembly plane P1 during operation of the wall frame assembly system 10 to assemble the wall frame F. In the illustrated embodiment, the drive assembly 152 comprises a drive chain, however, other means for moving the holder 148 can be implemented without departing from the scope of the disclosure.

Figure 17:
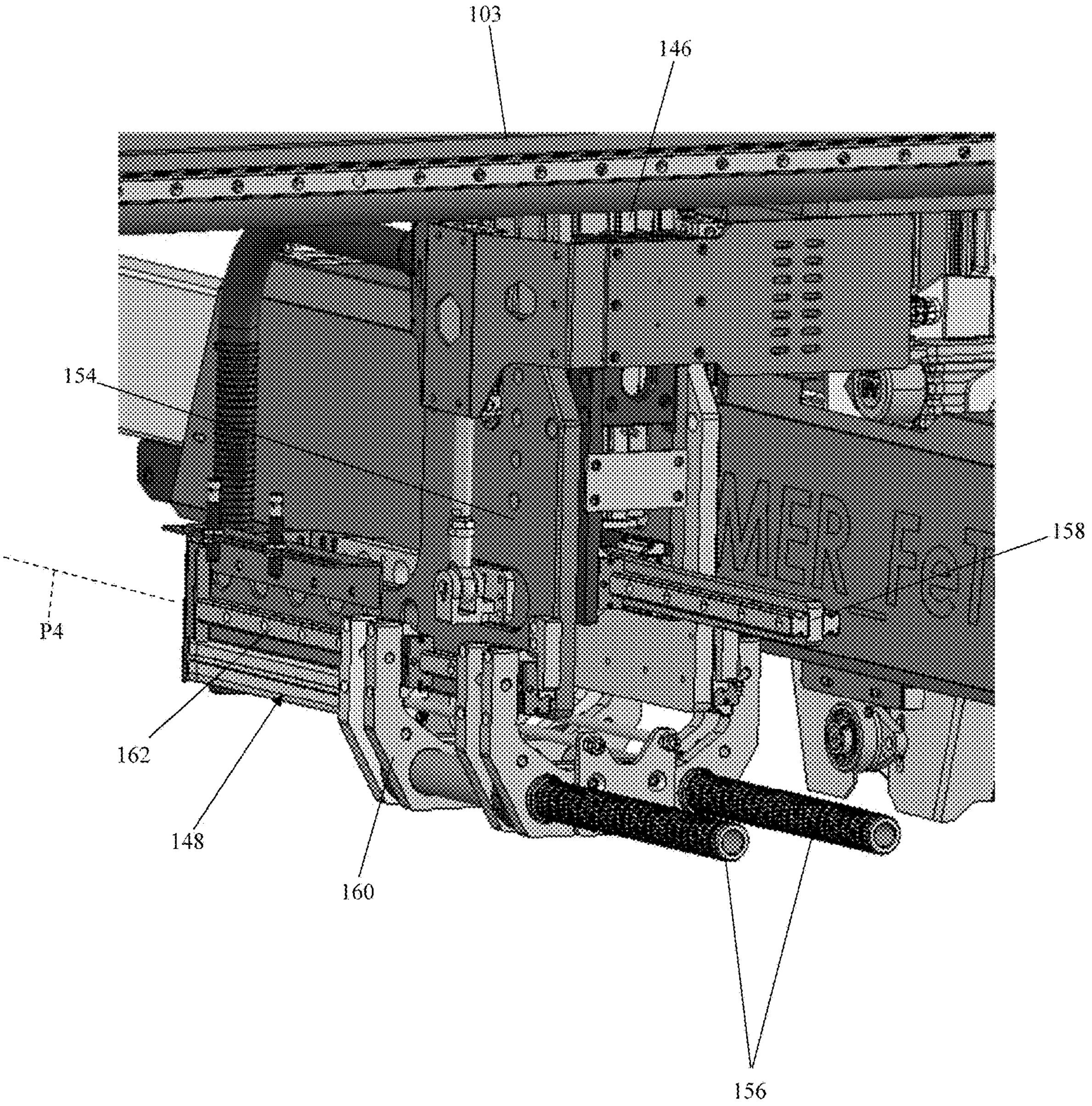
FIG. 17 is an enlarged fragmentary perspective of the gantry assembly showing a lower portion of the descender.
Figure 22:
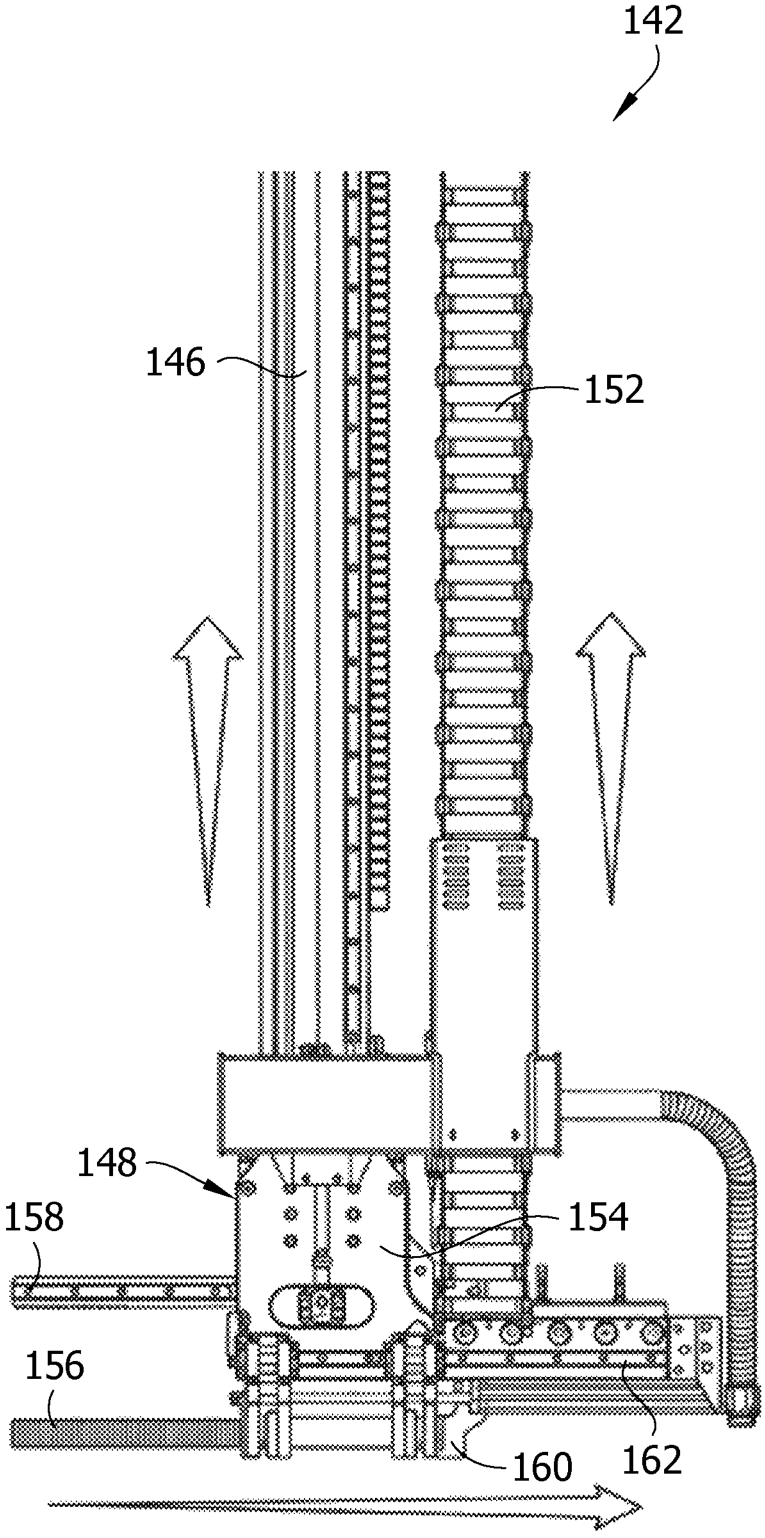
FIG. 22 is an enlarged side view of a descender of the gantry assembly.

Referring to FIGS. 17 and 22, each holder 148 comprises a holder body 154 attached to the column 146 of the descender 142, lower fixed holder arms 156 attached to the holder body, and an upper movable holder arm 158 movably attached to the holder body. In the illustrated embodiment, the fixed holder arms 156 comprise elongate rods having a grip surface disposed thereon. In the illustrated embodiment, there are two fixed holder arms 156 laterally spaced apart from each other. However, a single fixed arm 156 or more than two fixed arms could be utilized without departing from the scope of the disclosure. The movable holder arm 158 is attached above the fixed holder arms 156 and positioned generally between the fixed holder arms such that the movable holder arm is centered between the fixed holder arms. The movable holder arm 158 may be passively or actively movable with respect to the holder body 154 to adjust a distance between the movable holder arm and the fixed holder arms 156 to accommodate the frame member MS for being carried by the descender 142. For example, the movable holder arm 158 may be operatively connected to a drive assembly for actively moving the movable holder arm relative to the holder body 154. In one embodiment, the drive assembly may configure the movable holder arm 158 for pivotal or translational movement relative to the holder body 154. Alternatively, the movable holder arm 158 may be passively movable such that the arm is configured to float within an adjustment space on the holder body 154. In this embodiment, engagement by a frame member MS may cause the movable arm 158 to move (e.g., upward) to account for the height of the frame member. It will be understood that other configurations for mounting the movable arm 158 to the holder body 154 are envisioned without departing from the scope of the disclosure. Further, the lower holder arms 156 may also be movable with respect to the holder body 154. For instance, the lower holder arms 156 may be translatable horizontally (i.e., forward and backward) to adjust an amount the lower holder arms project forwardly from the holder body 154. In the illustrated embodiment, the lower arms 156 are mounted on a slide 160 which is slidable along rails 162 on the holder body 154. However, the lower arms 156 may be configured for movement by other mechanisms without departing from the scope of the disclosure. Further, the lower arms 156 and upper arms 158 may have other configurations without departing from the scope of the disclosure.

Figure 18:
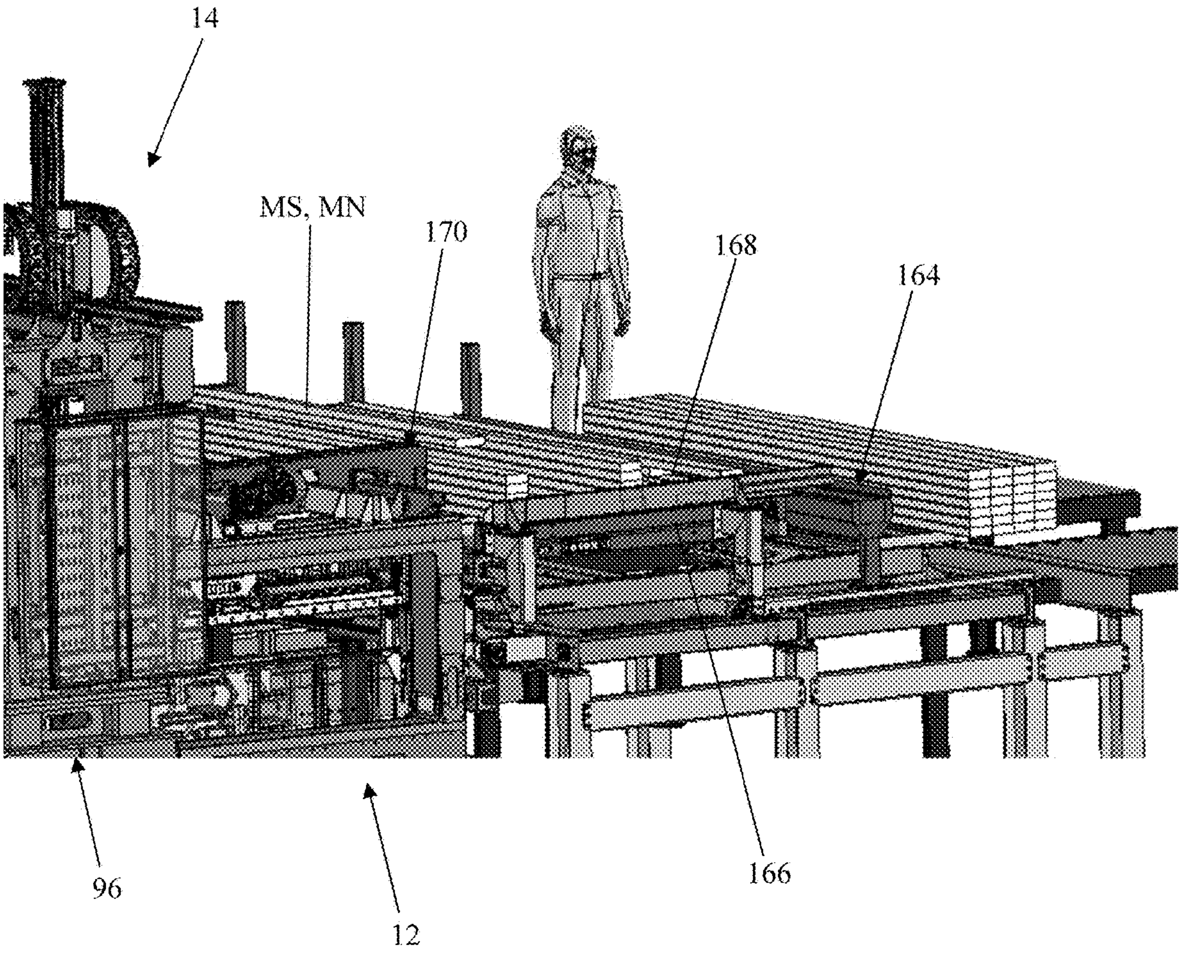
FIG. 18 is a fragmentary perspective showing a feeding deck conveyor and frame member shuttle of the wall frame assembly system.

Referring to FIGS. 1 and 18, a feeding deck conveyor 164 may be supported on the floor in the assembly space and configured to transport frame members MS, MN for delivery to the gantry assembly 14. The feeding deck conveyor 164 may comprise decking 166 and a conveyor belt 168 supported on the decking for transporting the frame members MS, MN toward the gantry assembly 14. A frame member shuttle 170 may be disposed between the feeding deck conveyor 164 and the gantry assembly 14. The shuttle 170 may be configured to receive the frame members MS, MN from the feeding deck conveyor 164 and deliver the frame members to the gantry assembly 14. In one embodiment, the feeding deck conveyor 164 delivers the frame members MS, MN in a first orientation to the frame member shuttle 170 and the shuttle reorients the frame members into a second orientation for handling by the gantry assembly 14, and in particular, the descenders 142. For example, the feeding deck conveyor 164 may transport the frame members MS, MN whereby major surfaces of the frame members extend generally horizontally, and the frame member shuttle 170 may reorient the frame members whereby the major surfaces of the frame members extend generally vertically. Therefore, in one embodiment, the frame member shuttle 170 is configured to flip or reorient the frame members MS, MN by about 90 degrees. It will be understood that the feeding deck conveyor 164 and frame member shuttle 170 may orient and reorient the frame members MS, MN in other ways without departing from the scope of the disclosure. Further, one or both of the feeding deck conveyor 164 and frame member shuttle 170 can be omitted without departing from the scope of the disclosure.

Referring to FIGS. 1, 4, 7, and 8, a wall frame assembly process may begin by the first and second conveyors 18, 22 of the advancer assembly 12 transporting top and bottom plate frame members MP, respectively, along the conveyor platforms 30 toward the first and second frames 20, 24. The frame members MP will be advanced by the conveyors 18, 22 until the frame members engage the reference bars 62 at which point the forward progress of the frame members MP will be halted. The system 10 may then sense the position of the frame members MP and activate the clamping cylinders 58 on the frames 20, 24 causing the clamping arms 60 to engage the frame members to temporarily hold the frame members in place. The reference bars 62 may also be activated to move (i.e., pivot) from their first, blocking position in which the reference bars impede movement of the frame members MP along the assembly axis AA, to their second position to clear the path for the frame members MP once movement of the frame members along the assembly axis is restored.

Figure 15:
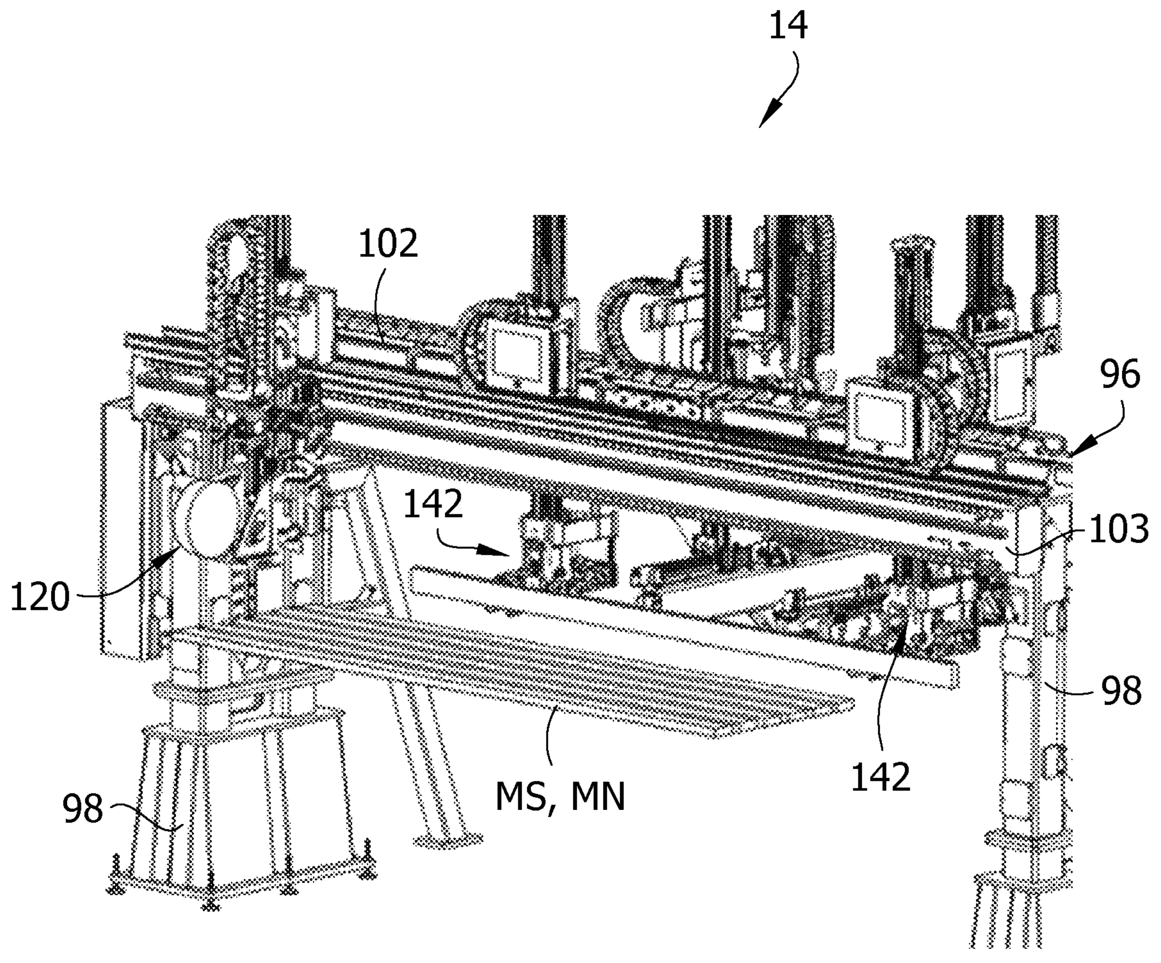
FIG. 15 is a perspective of the gantry assembly showing frame members being delivered to descenders of the gantry assembly.
Figure 16:
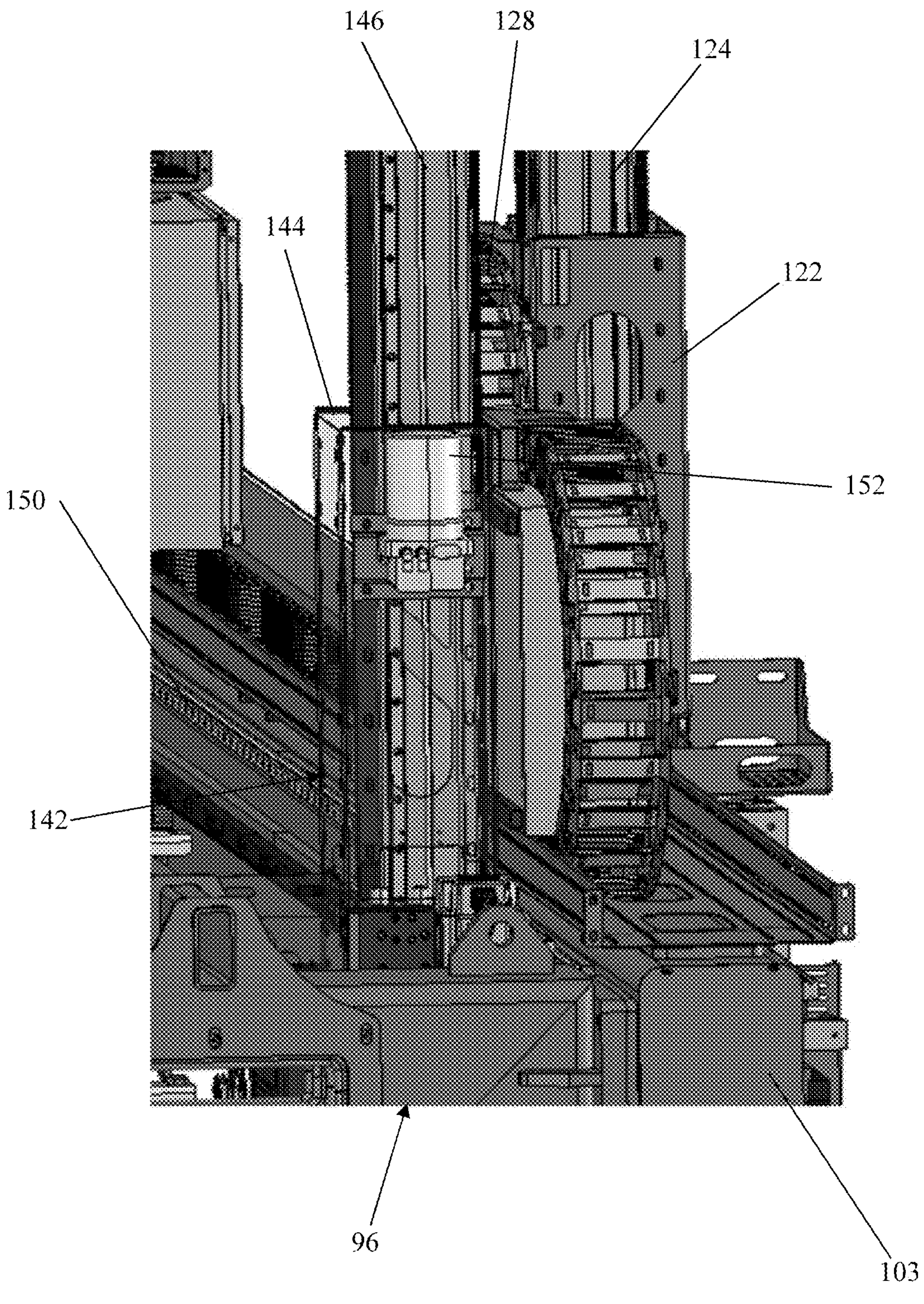
FIG. 16 is an enlarged fragmentary perspective of the gantry assembly showing an upper portion of a descender.

Referring to FIGS. 15 and 18, concurrently with the in-feeding of the plate frame members MP, frame members MS on the feeding deck conveyor 164 are being fed to the gantry assembly 14 for being handled by the descenders 142. More particularly, the frame members MS are fed by the deck conveyor 164 to the frame member shuttle 170 where the shuttle delivers individual frame members to the descenders 142 one at a time. The shuttle 170 may be configured to select a predetermined sequence of frame members to assemble a predetermined wall frame. Thus, shuttle 170 may be considered a "smart system" whereby the shuttle is configured to detect the proper frame member or frame member unit and deliver the desired frame member/unit to the gantry assembly 14. As previously indicated, the frame member shuttle 170 flips or reorients the frame members MS such that the frame members are oriented in the desired orientation for being handled by the descenders 142. Therefore, the shuttle 170 may flip a frame members MS from a horizontal orientation to a vertical orientation, or from a vertical orientation to a horizontal orientation depending on the intended use of the frame member within the wall frame. The holder arms 156, 158 of the descenders 142 may then grasp the top and bottom surfaces of the frame member MS to secure the frame member to the descenders. Depending on the size and orientation, one or more of the holder arms 156, 158 may be moved to accommodate the frame member MS between the holder arms. Once received between the upper and lower holder arms 158, 156, the upper holder arm 158 may be actively moved to create a clamping force between the holder arms to retain the frame member MS to the descenders 142.

Prior to receiving the frame members MS from the shuttle 170, the descenders 142 may be lowered from their elevated first positions (FIG. 17) generally at the fourth assembly plane P4 to their first lowered positions (FIG. 15) generally at the third assembly plane P3 to register the descenders with the shuttle. This will allow the shuttle 170 to deliver the selected frame members MS to the descenders 142. During, before, or after the movement of the descenders 142, the nog fetchers 104 having a nog frame member MN already received in the frame holder 110 may be moved (i.e., lowered) to the third assembly plane P3 to locate the nog frame member in registration with the stud frame member MS held by the descenders 142. The nog fetcher 104 may also be moved laterally to locate the nog frame member MN in the proper lateral position relative to the stud frame member MS.

Figure 19:
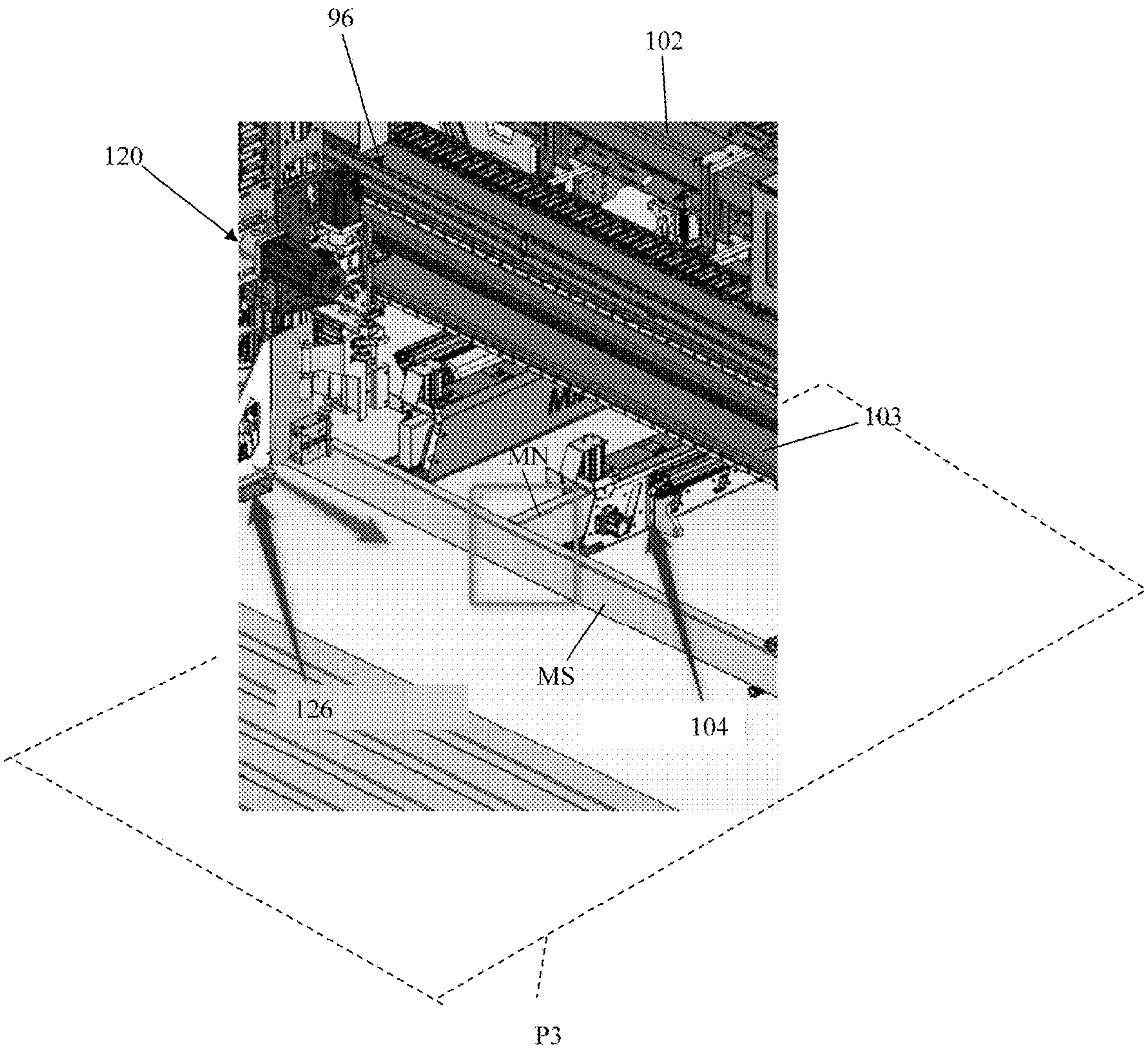
FIG. 19 is an enlarged fragmentary perspective of the gantry assembly showing a nog fetcher carrying a frame member.
Figure 20:
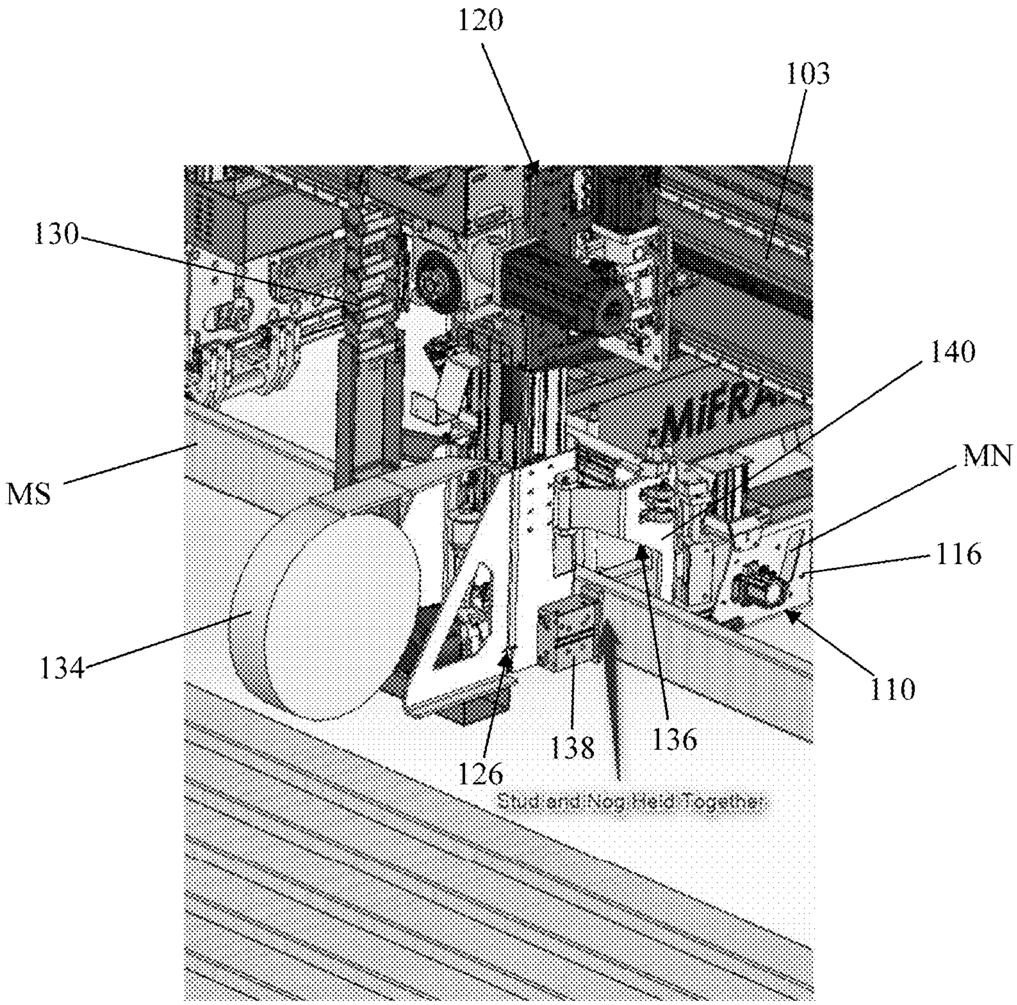
FIG. 20 is an enlarged fragmentary perspective of the gantry assembly showing the nog fetcher and nailer assembly attaching frame members together.

Referring to FIGS. 19 and 20, the stud frame member MS and nog frame member MN are now generally positioned for being attached together. Thus, the nailer assembly 120 can then be moved into position to attach the frame members MS, MN together. As such, the nailer assembly 120 can be moved vertically, such as by lowering the nailer assembly wherein by the nailer 126 is located generally at the third assembly plane P3. Additionally, the nailer assembly 120 may move laterally along the gantry frame 96 to locate the nailer 126 at the juncture between the frame members MS, MN. Therefore, the nailer 126 may move from the position shown in FIG. 19 to the position shown in FIG. 20 to position the nailer for attaching the frame members MS, MN. In order to ensure the frame members MS, MN are properly positioned, the drive assembly 118 in the frame holder 110 may be activated to move the nog frame member MN in the frame holder to abut or closely oppose the stud frame member MS held by the descenders 142. This action will have the effect of pushing the stud frame member MS into the back stops 138 on the clamp unit 136 on the nailer 126. The nailer 126 can then activate the clamp arms 140 of the clamp unit 136 so that the arms engage and clamp the frame members MS, MN in place. In this configuration, the nailer 126 can now operate the nail gun 132 to drive one or more nails into the frame members MS, MN to permanently secure the frame members together. The assembled frame members MS, MN may form a frame member unit configured to be used in the assembly of the wall frame F.

Figure 21:
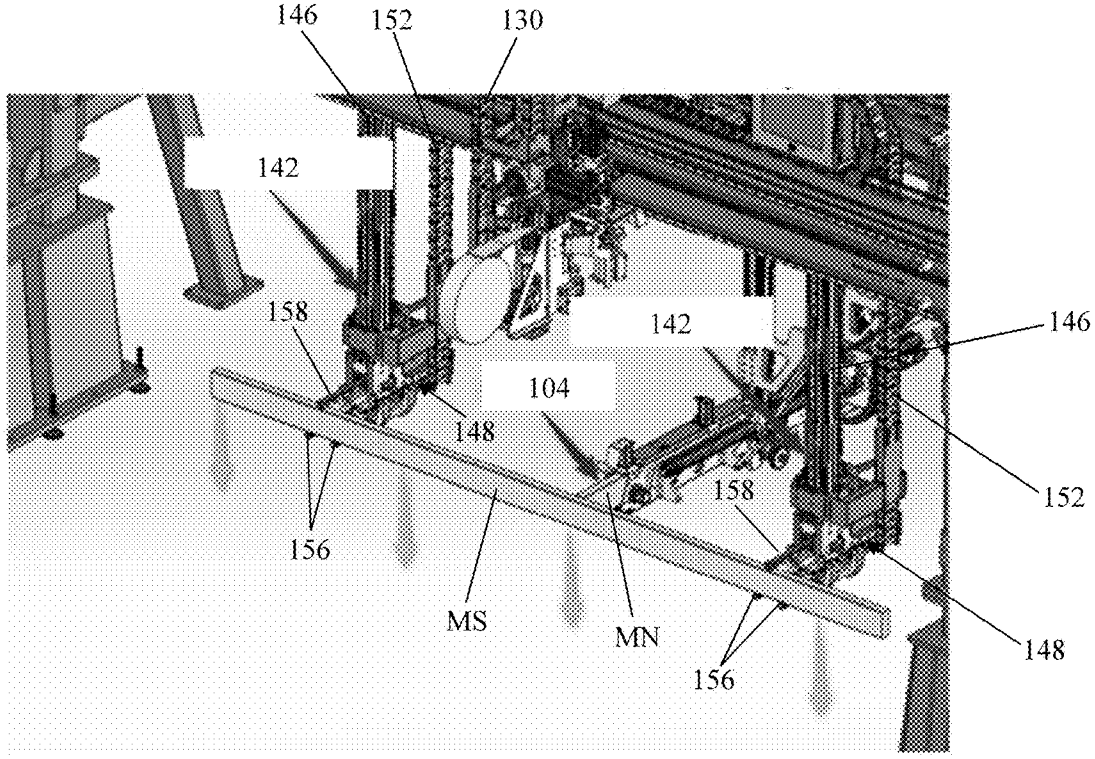
FIG. 21 is an enlarged fragmentary perspective of the gantry assembly showing descenders and the nog fetcher carrying an assembled frame member unit.
Figure 23:
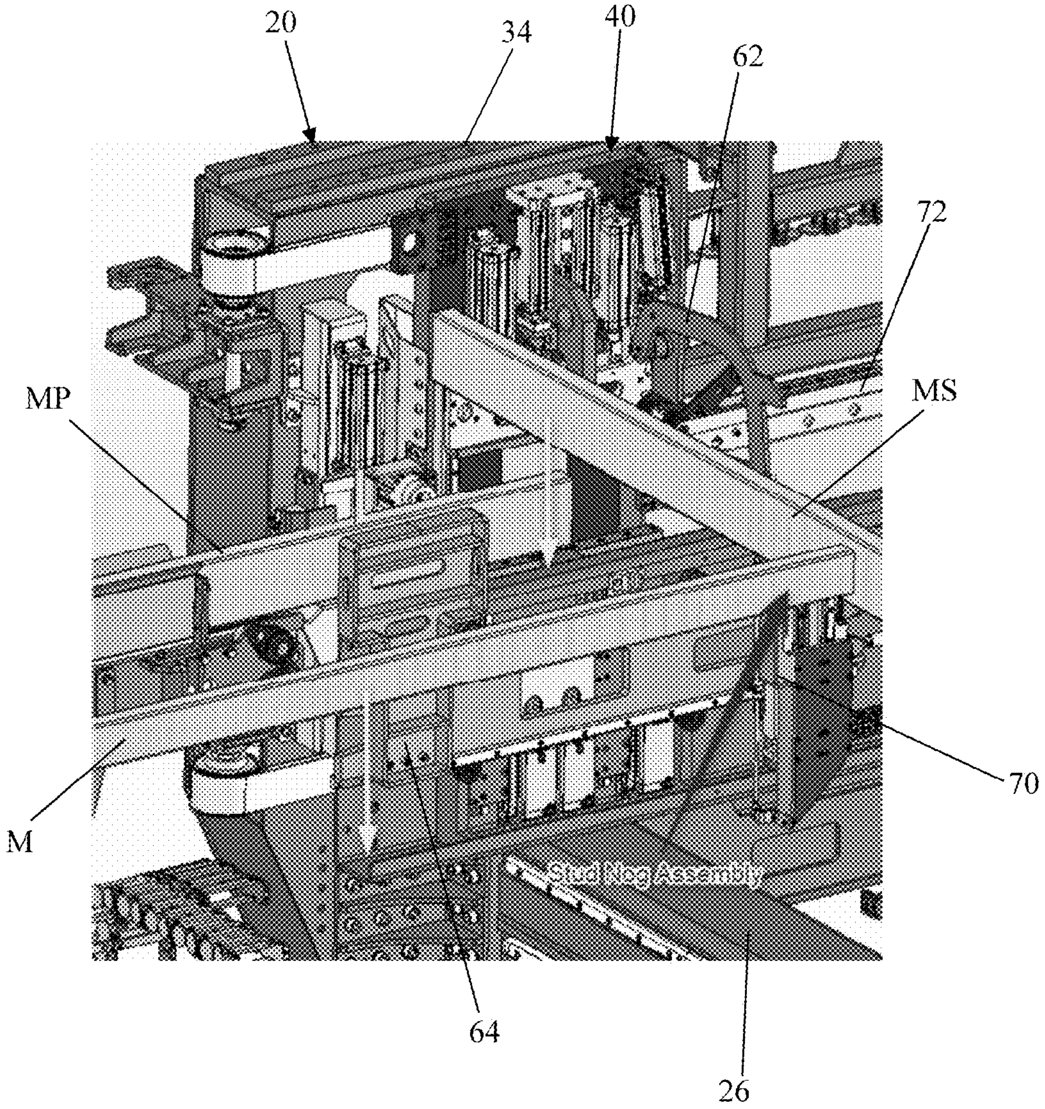
FIG. 23 is another enlarged fragmentary perspective of the advancer assembly showing the assembled frame member unit being delivered to the advancer assembly.

Referring to FIGS. 21-23, the assembled frame member unit is lowered by the descenders 142 and the nog fetcher 104 from generally at the third assembly plane P3 where the unit was assembled to the first assembly plane P1 for handling by the advancer assembly 12. Once the frame member unit is lowered to the advancer assembly 12, the descenders 142 are disengaged with the stud frame member MS and raised back up toward their first lowered position (i.e., third assembly plane P3) or their raised position (i.e., fourth assembly plane P4) for subsequent use in the wall frame assembly process. It will be understood that if in the previous steps a nog frame member MN is not attached to the stud frame member MS, then only the descenders 142 may be lowered to the advancer assembly 12. In this case, the nog fetchers 104 will remain idle and ready for use in any future steps. FIG. 22 illustrates the movement of a descender 142 whereby the descender is moved rearward to disengage the holder arms 156, 158 from the stud frame member MS and then moved upward to one of the elevated positions.

Figure 24:
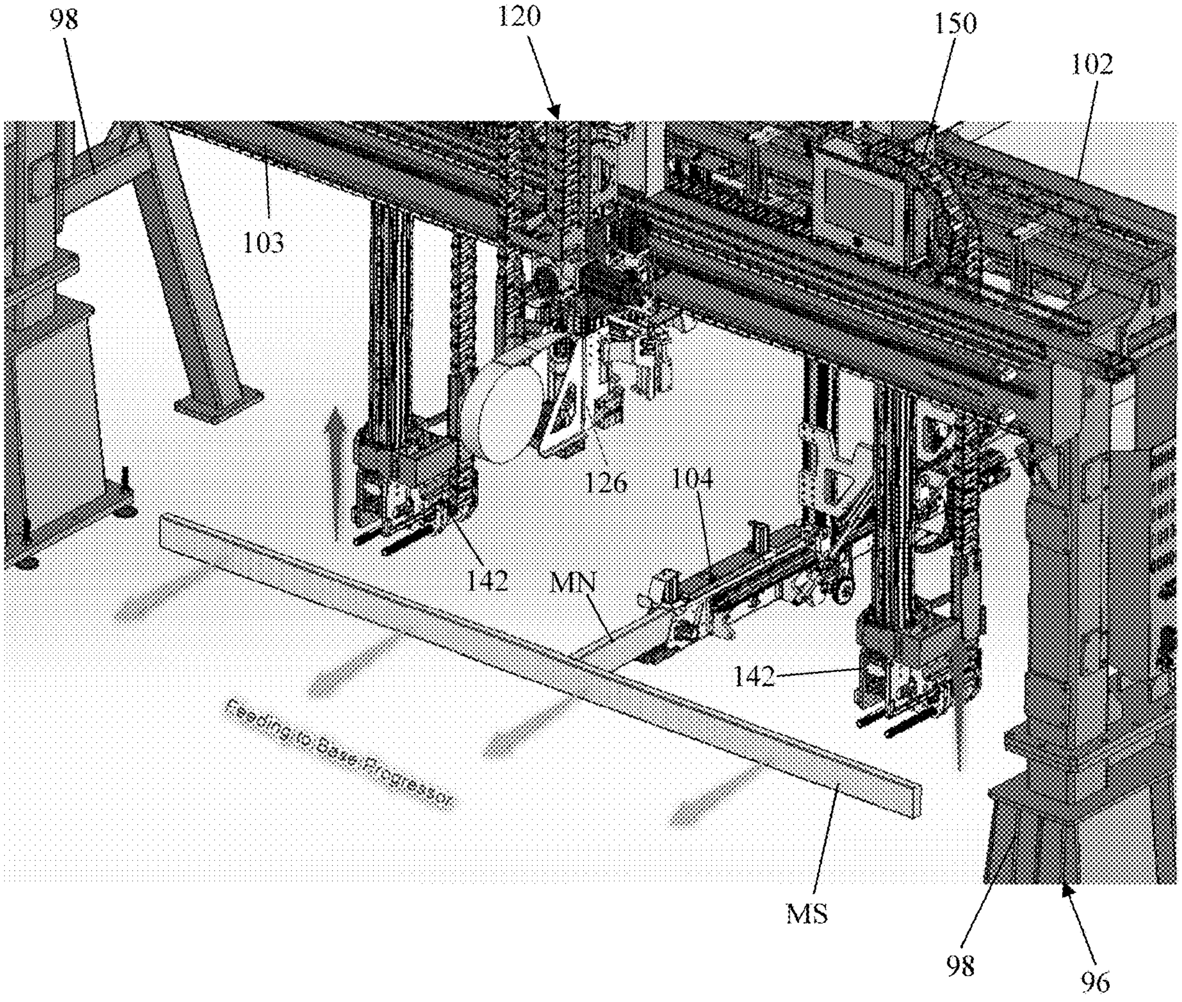
FIG. 24 is an enlarged fragmentary perspective view of the gantry assembly showing the assembled frame member unit being delivered to the advancer assembly.
Figure 25:
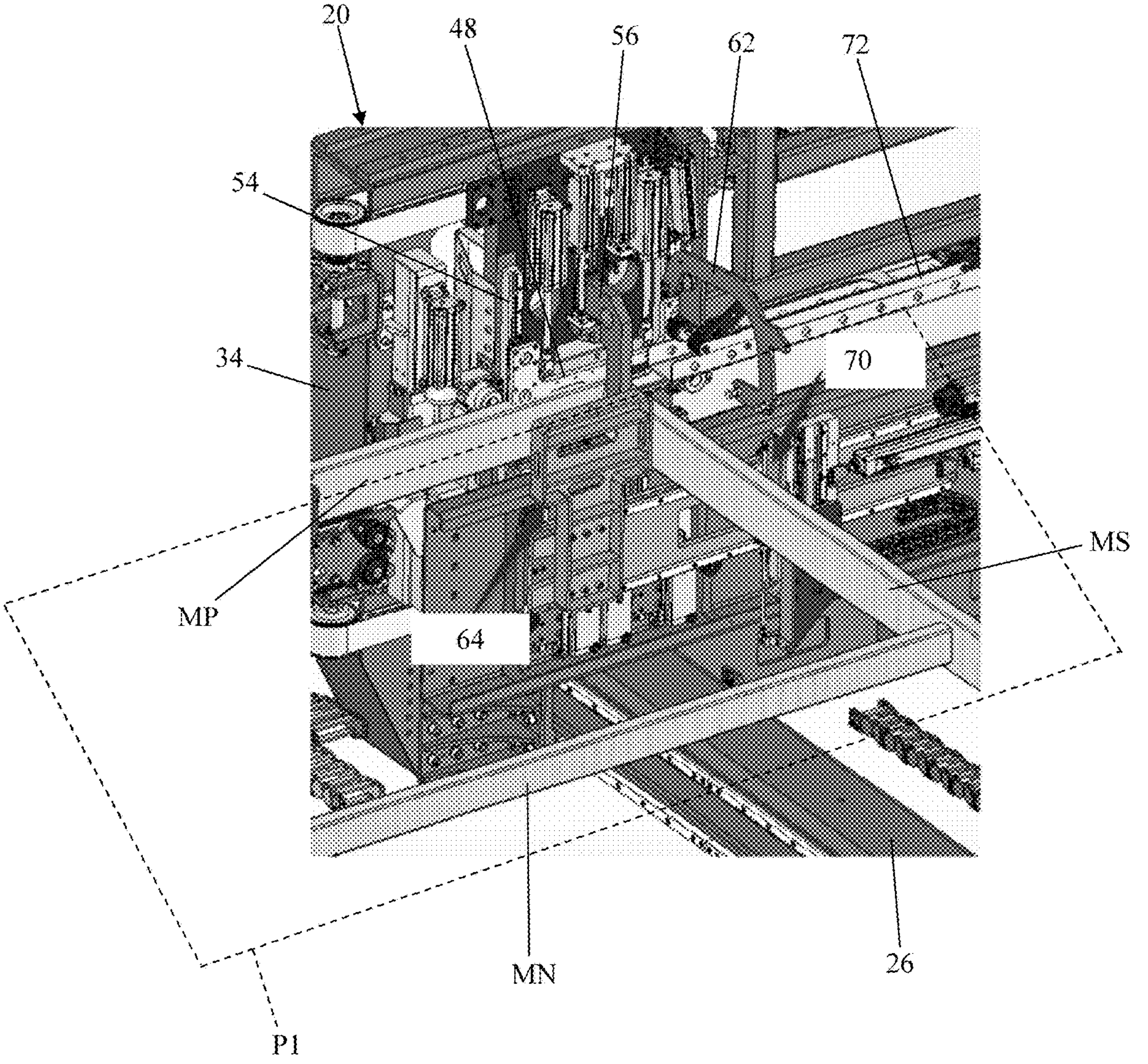
FIG. 25 is an enlarged fragmentary perspective of the advancer assembly showing the assembled frame member unit being located relative to a frame member on the advancer assembly and attached to the frame member.

Referring to FIGS. 24 and 25, as the descenders 142 are being raised, the movement of the nog fetcher 104 is further illustrated. In particular, the drive assembly 118 in the frame holder 110 may be activated to move the stud frame MS in the frame holder thereby moving the frame member unit along the assembly axis AA. This may be done to position the stud frame member MS of the assembly frame member unit upstream of the stud pushers 64 on the frames 20, 24 of the advancer assembly 12. Movement of the slides 66 can then be actuated to cause the stud pushers 64 to move forwardly along the assembly axis AA. This movement will cause the stud pushers 64 to push against the stud frame member MS thereby pushing the frame member into the back stop 70. In this position, the assembled frame member unit, and in particular the stud frame member MS will be properly positioned relative to the plate frame members MP for attachment to the plate frame members.

Referring to FIGS. 5, 6, and 25, with the frame members MP, MS properly located, the carriage unit 40 is used to first temporarily clamp the frame members together and then permanently secure the frame members together. This is done initially by actuating the fixtures 46, 48 to clamp the plate frame members MP to the stud frame member MS. Therefore, the top fixture 48 may be moved downward to engage the tops of the frame members MP, MS to clamp the frame members between the top fixture and the bottom fixture 46. Additionally, the plate pushers 54 engage outer major surfaces of the plate frame members MP to press the inner major surfaces of the plate frame members into the end surfaces of the stud plate member MS. Also, the stud clamp 56 engages the inner major surface of the stud fame member MS to hold the stud member in place against the stud back stop 70. The nail guns 53 on the carriage units 40 may then drive one or more nails into the outer major surfaces of the plate frame members MP such that the nails are driven through the plate frame members and into the stud frame member MS thereby attaching the plate frame members to the stud frame members.

Figure 26:
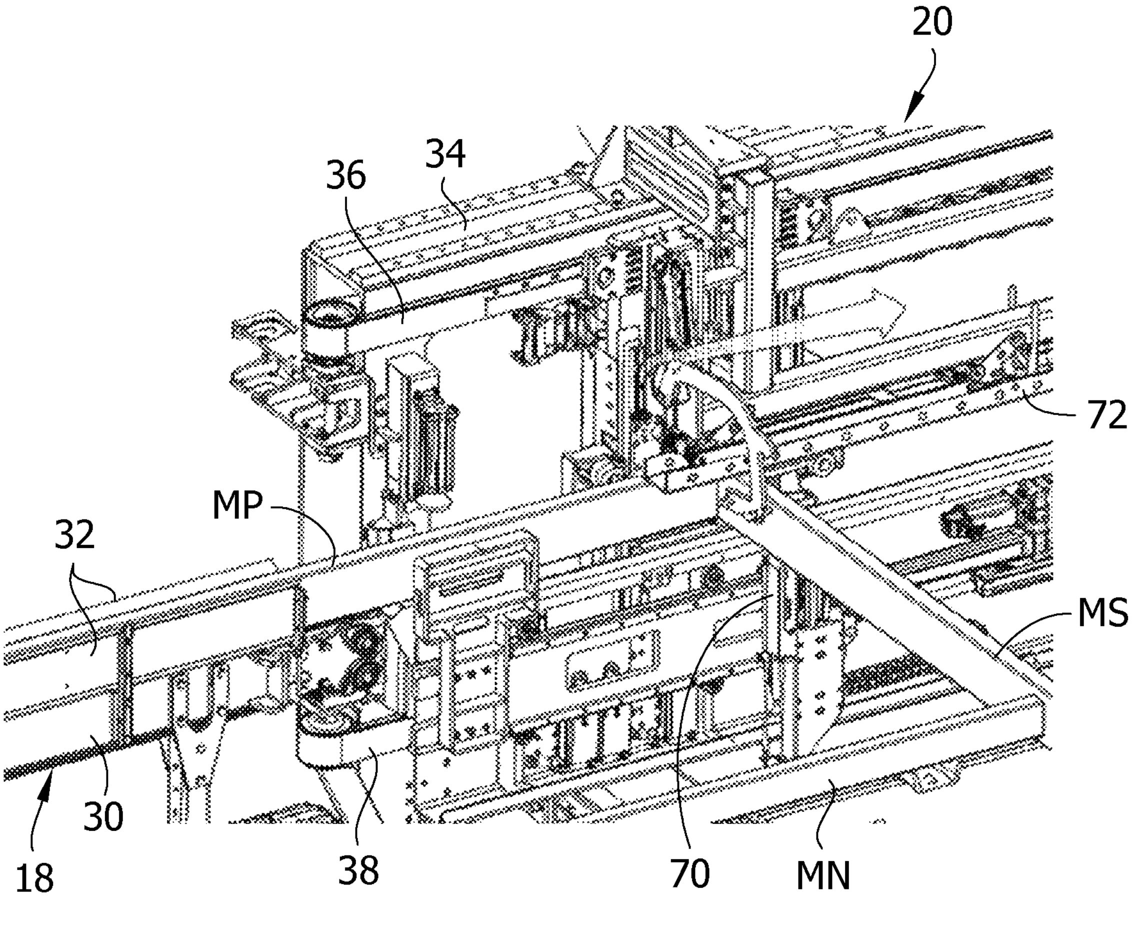
FIG. 26 is an enlarged fragmentary perspective of the advancer assembly showing the assembled frame member unit and frame member being transported along an assembly axis by the advancer assembly.

Referring to FIGS. 25-27, the carriage unit 40 remains engaged with the frame members MP, MS after the plate frame members have been attached to the stud frame member. In particular, the fixtures 46, 48, plate pushers 54, and stud clamps 56 remain in contact with the frame members MP, MS. The carriage 40 is then moved along the transport units 36, 38 thereby carrying the frame members MP, MS, MN with the carriage unit. The movement of the carriage 40 from the initial assembly position shown in FIG. 25 to the second assembly position shown in FIG. 27 advances the frame members MP, MS, MN along the assembly axis AA.

In the second assembly position, the nog grabber 94 on the gripper assembly 90 is actuated to grab and hold the nog frame member MN for subsequently being cut to a desired length by the saw 76 on the assembly unit 28. More particularly, the saw 76 may cut longer nog frame member stock to the length of the final nog frame member MN. In particular, the nog grabber 94 is raised from its first lowered position to its second, raised position to locate the nog grabber at the proper height for engaging with the nog frame member MN. The arms 100 on the nog grabber 94 are then actuated (e.g., rotated relative to the stem 98) to grab the frame member MN and secure the frame member in place. Once the frame members have been moved to the second assembly position and the nog frame member MN is grasped by the nog grabber 94, the carriage unit 40 releases its engagement with the frame members MS, MP and moves back to the first assembly position for use in assembling the remainder of the wall frame F.

Referring to FIG. 27, the saw 76 on the assembly unit 28 is then raised from its first, lowered position to its second, raised position to locate the saw at the proper height for engaging with the frame member MN. During the process of raising the saw 76, the saw cuts the nog frame members MN to shorten the length of the nog frame member to the actual size needed for use in the wall frame F. The nog fetcher 104 holding the remainder of the nog frame member MN is then raised back up to the third assembly plane P3. The nog frame member MN still held in the nog fetcher 104 can then be readied for attachment to another stud frame member MS that is delivered to the gantry assembly 14 for the assembly of another frame member unit.

Referring to FIGS. 28 and 29, in a subsequent assembly step, another assembled frame member unit (FIG. 28) or any other suitable frame member/unit (FIG. 29) can be attached to the cut nog frame member MN by the nail gun 78 on the assembly unit 28. The gantry assembly 14 may retrieve or assemble the additional frame member units concurrently with the attachment of the previously assembled frame member units by the advancer assembly 12 so that the newly retrieved/formed frame member units are continuously made available for attachment by the advancer assembly. The deliver process will be similar to the one previously described where the descenders 142, and possibly the nog fetcher 104, transport the frame member/unit to the advancer assembly 12, and the carriage 40 on the advancer assembly locates, attaches, and transports the frame members MP, MS, MN. The nail gun 78 may be raised from its first lowered position to its second, raised position to locate the nail gun at the proper height for engaging with the frame member/unit delivered to the advancer assembly. The nail gun 78 can then drive one or more nails into the frame member/unit to further secure the frame member/unit to the previously cut nog frame member MN. This process of forming and delivering frame members/units to the advancer assembly 12 is generally repeated until the entire wall frame F is assembled. It will be understood that the process can be altered in order to make particular features of the wall frame, for example openings for windows and doors.

The control system 16 may be configured to control one or more controllable component of the wall frame assembly system 10. In one embodiment, the control system is configured to control only gantry assembly 14. In another embodiment, the control system 16 may control the operation of the advancer assembly 12, the gantry assembly 14, the feeding deck conveyor 164, and the frame member shuttle 170. Thus, broadly, the control system 16 may include all the software (e.g., programming) configured to operate the wall frame assembly system 10 and any controllers or computers (e.g., hardware) configured to execute the software on the various components of the wall frame assembly system.

In an embodiment, control system 16 comprises one or more programmable logic controllers (PLCs) that execute commands in accordance with a recipe command structure to control operation of the components of wall frame assembly system 10, including advancer assembly 12, gantry assembly 14, feeding deck conveyor 164, and/or frame member shuttle 170. For instance, general file format instructions are processed to create a recipe command structure that the PLC-based control system 16 executes. Examples of general file formats include Mathematical Programming System (MPS) and Extensible Markup Language (XML). The recipe commands factor in dependencies necessary for sequential operations in addition to specifying simultaneous operations to improve efficiency and increase throughput.

In another embodiment, control system 16 may include a display, a user interface and a computer connected to the user interface and the display (e.g., a desktop computer). The computer may also contain production software that is configured (e.g., programmed) to operate the wall frame assembly system 10.

A production manager may access and interface with the production software via the display and user interface to set and control (e.g., manage) the operation of the wall frame assembly system 10. To operate the wall frame assembly system 10, the production manager may, in one embodiment, import one or more wall frame design files containing data related to one or more wall frame designs into the production software. Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions, or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

Having described the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved, and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A method of assembling a wall frame using an automated wall frame assembly system comprising:

transporting first frame members along an assembly axis using an advancer assembly of the automated wall frame assembly system to an engagement position;

delivering a second frame member to the advancer assembly and to the engagement position from a location above the advancer assembly using a gantry assembly of the automated wall frame assembly system disposed above the advancer assembly, the gantry assembly being distinct from the advancer assembly that moves the first frame members to the engagement position;

engaging the second frame member with at least one of the first frame members at the engagement position; and attaching the second frame member engaged with the at least one of the first frame members using the advancer assembly.

2. The method of claim 1, further comprising assembling a frame member unit including the second frame member and a third frame member using the gantry assembly.

3. The method of claim 1 wherein said step of engaging the second frame member with at least one of the first frame members at the engagement position comprises causing relative movement of the second frame member with respect to said at least one of the first frame member at the engagement position to bring the second frame member into contact with said at least one first frame member.

4. The method of claim 1 wherein delivering the second frame member to the advancer assembly and to the engagement position from a location above the advancer assembly comprises moving the second frame member downwardly to the engagement position in which a horizontal plane intersecting the second frame member intersects said at least one of the first frame members.

5. The method of claim 1 wherein delivering the second frame member to the advancer assembly and to the engagement position from a location above the advancer assembly comprises moving the second frame member along a travel axis that is transverse to the assembly axis.

6. A method of assembling a wall frame using an automated wall frame assembly system comprising:

transporting first frame members along an assembly axis using an advancer assembly of the automated wall frame assembly system;

delivering a second frame member to the advancer assembly from a location above the advancer assembly using a gantry assembly of the automated wall frame assembly system disposed above the advancer assembly;

attaching the second frame member to the first frame members using the advancer assembly; and assembling a frame member unit including the second frame member and a third frame member using the gantry assembly;

wherein the second frame member is attached to the first frame member at a first assembly plane, and the frame member unit is assembled at a second assembly plane disposed above the first assembly plane.

7. A method of assembling a wall frame using an automated wall frame assembly system comprising:

transporting first frame members along an assembly axis using an advancer assembly of the automated wall frame assembly system;

delivering a second frame member to the advancer assembly from a location above the advancer assembly using a gantry assembly of the automated wall frame assembly system disposed above the advancer assembly;

attaching the second frame member to the first frame members using the advancer assembly; and assembling a frame member unit including the second frame member and a third frame member using the gantry assembly;

wherein the first frame members comprise top and bottom plate members of the wall frame, the second frame members comprises a stud member extending between the top and bottom plate members, and the third frame member comprises a nogging extending parallel to the first frame members.

* * * * *